(12) United States Patent
Martin

(10) Patent No.: US 8,078,602 B2
(45) Date of Patent: Dec. 13, 2011

(54) SEARCH ENGINE FOR A COMPUTER NETWORK

(75) Inventor: Anthony G. Martin, Los Altos, CA (US)

(73) Assignee: Claria Innovations, LLC, Sherman Oaks, CA (US)

( * ) Notice: Subject to any disclaimer, the term of this patent is extended or adjusted under 35 U.S.C. 154(b) by 331 days.

(21) Appl. No.: 11/015,583

(22) Filed: Dec. 17, 2004

(65) Prior Publication Data

US 2006/0136378 A1    Jun. 22, 2006

(51) Int. Cl.
*G06F 7/00* (2006.01)
*G06F 17/30* (2006.01)

(52) U.S. Cl. ........ 707/706; 707/709; 707/711; 707/748; 709/217

(58) Field of Classification Search ................ 707/1–10, 707/100–104.1, 200–206
See application file for complete search history.

(56) References Cited

U.S. PATENT DOCUMENTS

| | | |
|---|---|---|
| 4,455,083 A | 6/1984 | Elmes |
| 4,575,579 A | 3/1986 | Simon et al. |
| 4,719,567 A | 1/1988 | Whittington et al. |
| 4,775,935 A | 10/1988 | Yourick |
| 4,782,449 A | 11/1988 | Brinker et al. |
| 4,799,146 A | 1/1989 | Chauvel |
| 4,850,007 A | 7/1989 | Marino et al. |
| 4,977,594 A | 12/1990 | Shear |
| 5,027,400 A | 6/1991 | Baji et al. |
| 5,029,104 A | 7/1991 | Dodson et al. |
| 5,093,718 A | 3/1992 | Hoarty et al. |
| 5,099,420 A | 3/1992 | Barlow et al. |
| 5,105,184 A | 4/1992 | Pirani et al. |
| 5,159,669 A | 10/1992 | Trigg et al. |
| 5,165,012 A | 11/1992 | Crandall et al. |
| 5,196,838 A | 3/1993 | Meier et al. |
| 5,202,961 A | 4/1993 | Mills et al. |
| 5,220,420 A | 6/1993 | Hoarty et al. |
| 5,220,516 A | 6/1993 | Dodson et al. |
| 5,220,564 A | 6/1993 | Tuch et al. |
| 5,231,499 A | 7/1993 | Trytko |
| 5,247,517 A | 9/1993 | Ross et al. |
| 5,253,341 A | 10/1993 | Rozmanith et al. |

(Continued)

FOREIGN PATENT DOCUMENTS

EP    0631231    12/1994

(Continued)

OTHER PUBLICATIONS

Favela et al., Image-retrieval agent: integrating image content and text, 1999, IEEE, vol. 14, 36-39.*

(Continued)

*Primary Examiner* — Jean B Fleurantin
(74) *Attorney, Agent, or Firm* — Davidson Berquist Jackson & Gowdey, LLP; Brian Siritzky

(57) ABSTRACT

In one embodiment, client-side programs are employed to observe the navigation of consumers to various websites. Addresses of web pages viewed by consumers may be used to fetch the web pages. A fetched web page may be parsed for one or more keywords. The relevance of the web page to a keyword may be ranked according to consumer preferences, which may relate to consumer interaction with the web page. Web pages and their ranking information may be stored in an index. The index may be consulted to find links to web pages relevant to a keyword employed in a search request.

28 Claims, 6 Drawing Sheets

U.S. PATENT DOCUMENTS

| | | |
|---|---|---|
| 5,268,963 A | 12/1993 | Monroe et al. |
| 5,283,639 A | 2/1994 | Esch et al. |
| 5,283,731 A | 2/1994 | Lalonde et al. |
| 5,285,442 A | 2/1994 | Iwamura et al. |
| 5,297,249 A | 3/1994 | Bernstein et al. |
| 5,305,195 A | 4/1994 | Murphy |
| 5,307,456 A | 4/1994 | MacKay |
| 5,313,455 A | 5/1994 | van der Wal et al. |
| 5,315,580 A | 5/1994 | Phaal |
| 5,319,455 A | 6/1994 | Hoarty et al. |
| 5,321,740 A | 6/1994 | Gregorek et al. |
| 5,325,423 A | 6/1994 | Lewis |
| 5,325,483 A | 6/1994 | Ise et al. |
| 5,327,554 A | 7/1994 | Palazzi et al. |
| 5,333,237 A | 7/1994 | Stefanopoulos et al. |
| 5,347,632 A | 9/1994 | Filepp et al. |
| 5,355,472 A | 10/1994 | Lewis |
| 5,355,501 A | 10/1994 | Gross et al. |
| 5,361,091 A | 11/1994 | Hoarty et al. |
| 5,361,199 A | 11/1994 | Shoquist et al. |
| 5,361,393 A | 11/1994 | Rossillo |
| 5,367,621 A | 11/1994 | Cohen et al. |
| 5,373,375 A | 12/1994 | Weldy |
| 5,392,447 A | 2/1995 | Schlack et al. |
| 5,412,720 A | 5/1995 | Hoarty |
| 5,418,549 A | 5/1995 | Anderson et al. |
| 5,438,518 A | 8/1995 | Bianco et al. |
| 5,442,771 A | 8/1995 | Filepp et al. |
| 5,446,919 A | 8/1995 | Wilkins |
| 5,469,553 A | 11/1995 | Patrick |
| 5,481,741 A | 1/1996 | McKaskle et al. |
| 5,483,466 A | 1/1996 | Kawahara et al. |
| 5,491,785 A | 2/1996 | Robson et al. |
| 5,499,340 A | 3/1996 | Barritz |
| 5,500,890 A | 3/1996 | Rogge et al. |
| 5,515,098 A | 5/1996 | Carles |
| 5,515,270 A | 5/1996 | Weinblatt |
| 5,515,490 A | 5/1996 | Buchanan et al. |
| 5,517,612 A | 5/1996 | Dwin et al. |
| 5,524,195 A | 6/1996 | Clanton, III et al. |
| 5,524,197 A | 6/1996 | Uya et al. |
| 5,530,472 A | 6/1996 | Bregman et al. |
| 5,530,759 A | 6/1996 | Braudaway et al. |
| 5,530,852 A | 6/1996 | Meske et al. |
| 5,532,735 A | 7/1996 | Blahut et al. |
| 5,541,986 A | 7/1996 | Hou |
| 5,544,302 A | 8/1996 | Nguyen |
| 5,544,320 A | 8/1996 | Konrad |
| 5,548,745 A | 8/1996 | Egan et al. |
| 5,563,804 A | 10/1996 | Mortensen et al. |
| 5,564,043 A | 10/1996 | Siefert |
| 5,572,643 A | 11/1996 | Judson |
| 5,579,381 A | 11/1996 | Courville et al. |
| 5,583,560 A | 12/1996 | Florin et al. |
| 5,583,763 A | 12/1996 | Atcheson et al. |
| 5,584,025 A | 12/1996 | Keithley et al. |
| 5,590,046 A | 12/1996 | Anderson et al. |
| 5,594,509 A | 1/1997 | Florin et al. |
| 5,594,779 A | 1/1997 | Goodman |
| 5,596,718 A | 1/1997 | Boebert et al. |
| 5,602,905 A | 2/1997 | Mettke |
| 5,604,542 A | 2/1997 | Dedrick |
| 5,606,359 A | 2/1997 | Youden et al. |
| 5,608,850 A | 3/1997 | Robertson |
| 5,615,131 A | 3/1997 | Mortensen et al. |
| 5,615,325 A | 3/1997 | Peden |
| 5,617,526 A | 4/1997 | Oran et al. |
| 5,621,456 A | 4/1997 | Florin et al. |
| 5,627,886 A | 5/1997 | Bowman |
| 5,629,978 A | 5/1997 | Blumhardt et al. |
| 5,630,081 A | 5/1997 | Rybicki et al. |
| 5,635,979 A | 6/1997 | Kostreski et al. |
| 5,638,443 A | 6/1997 | Stefik et al. |
| 5,642,484 A | 6/1997 | Harrison, III et al. |
| 5,649,186 A | 7/1997 | Ferguson |
| 5,657,450 A | 8/1997 | Rao et al. |
| 5,664,948 A | 9/1997 | Dimitriadis et al. |
| 5,673,322 A | 9/1997 | Pepe et al. |
| 5,675,510 A | 10/1997 | Coffey et al. |
| 5,680,562 A | 10/1997 | Conrad et al. |
| 5,682,525 A | 10/1997 | Bouve et al. |
| 5,684,715 A | 11/1997 | Palmer |
| 5,684,969 A | 11/1997 | Ishida |
| 5,701,451 A | 12/1997 | Rogers et al. |
| 5,704,017 A | 12/1997 | Heckerman et al. |
| 5,706,434 A | 1/1998 | Kremen et al. |
| 5,706,502 A | 1/1998 | Foley et al. |
| 5,708,709 A | 1/1998 | Rose |
| 5,708,780 A | 1/1998 | Levergood et al. |
| 5,710,884 A | 1/1998 | Dedrick |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,721,827 A | 2/1998 | Logan et al. |
| 5,721,908 A | 2/1998 | Lagarde et al. |
| 5,724,521 A | 3/1998 | Dedrick |
| 5,724,556 A | 3/1998 | Souder et al. |
| 5,724,567 A | 3/1998 | Rose et al. |
| 5,727,129 A | 3/1998 | Barrett et al. |
| 5,727,159 A | 3/1998 | Kikinis |
| 5,734,863 A | 3/1998 | Kodosky et al. |
| 5,737,619 A | 4/1998 | Judson |
| 5,737,739 A | 4/1998 | Shirley et al. |
| 5,740,252 A | 4/1998 | Minor et al. |
| 5,740,549 A | 4/1998 | Reilly et al. |
| 5,742,768 A | 4/1998 | Gennaro et al. |
| 5,742,905 A | 4/1998 | Pepe et al. |
| 5,745,681 A | 4/1998 | Levine et al. |
| 5,751,956 A | 5/1998 | Kirsch |
| 5,754,830 A | 5/1998 | Butts et al. |
| 5,754,938 A | 5/1998 | Herz et al. |
| 5,754,939 A | 5/1998 | Herz et al. |
| 5,758,111 A | 5/1998 | Shiratori et al. |
| 5,758,257 A | 5/1998 | Herz et al. |
| 5,760,767 A | 6/1998 | Shore et al. |
| 5,761,601 A | 6/1998 | Nemirofsky et al. |
| 5,761,662 A | 6/1998 | Dasan |
| 5,768,508 A | 6/1998 | Eikeland |
| 5,768,510 A | 6/1998 | Gish |
| 5,781,894 A | 7/1998 | Petrecca et al. |
| 5,787,253 A | 7/1998 | McCreery et al. |
| 5,787,254 A | 7/1998 | Maddalozzo, Jr. et al. |
| 5,793,972 A | 8/1998 | Shane |
| 5,794,210 A | 8/1998 | Goldhaber et al. |
| 5,794,259 A | 8/1998 | Kikinis |
| 5,796,952 A | 8/1998 | Davis et al. |
| 5,801,685 A | 9/1998 | Miller et al. |
| 5,802,320 A | 9/1998 | Baehr et al. |
| 5,805,735 A | 9/1998 | Chen et al. |
| 5,805,815 A | 9/1998 | Hill |
| 5,809,242 A | 9/1998 | Shaw et al. |
| 5,809,481 A | 9/1998 | Baron et al. |
| 5,809,512 A | 9/1998 | Kato |
| 5,812,642 A | 9/1998 | Leroy |
| 5,812,769 A | 9/1998 | Graber et al. |
| 5,819,047 A | 10/1998 | Bauer et al. |
| 5,819,092 A | 10/1998 | Ferguson et al. |
| 5,822,526 A | 10/1998 | Waskiewicz |
| 5,832,502 A | 11/1998 | Durham et al. |
| 5,835,087 A | 11/1998 | Herz et al. |
| 5,835,092 A | 11/1998 | Boudreau et al. |
| 5,835,722 A | 11/1998 | Bradshaw et al. |
| 5,838,458 A | 11/1998 | Tsai |
| 5,848,246 A | 12/1998 | Gish |
| 5,848,396 A | 12/1998 | Gerace |
| 5,848,397 A | 12/1998 | Marsh et al. |
| 5,850,352 A | 12/1998 | Moezzi et al. |
| 5,850,433 A | 12/1998 | Rondeau |
| 5,854,897 A | 12/1998 | Radziewicz et al. |
| 5,855,008 A | 12/1998 | Goldhaber et al. |
| 5,861,880 A | 1/1999 | Shimizu et al. |
| 5,861,883 A | 1/1999 | Cuomo et al. |
| 5,862,260 A | 1/1999 | Rhoads |
| 5,862,325 A | 1/1999 | Reed et al. |
| 5,864,823 A | 1/1999 | Levitan |

| | | |
|---|---|---|
| 5,870,769 A | 2/1999 | Freund |
| 5,872,850 A | 2/1999 | Klein et al. |
| 5,875,296 A | 2/1999 | Shi et al. |
| 5,877,766 A | 3/1999 | Bates et al. |
| 5,878,231 A | 3/1999 | Baehr et al. |
| 5,883,955 A | 3/1999 | Ronning |
| 5,884,025 A | 3/1999 | Baehr et al. |
| 5,886,683 A | 3/1999 | Tognazzini et al. |
| 5,887,133 A | 3/1999 | Brown et al. |
| 5,890,152 A | 3/1999 | Rapaport et al. |
| 5,892,917 A | 4/1999 | Myerson |
| 5,893,053 A | 4/1999 | Trueblood |
| 5,893,118 A | 4/1999 | Sonderegger |
| 5,894,554 A | 4/1999 | Lowery et al. |
| 5,897,622 A | 4/1999 | Blinn et al. |
| 5,898,434 A | 4/1999 | Small et al. |
| 5,901,287 A | 5/1999 | Bull et al. |
| 5,903,892 A | 5/1999 | Hoffert et al. |
| 5,905,492 A | 5/1999 | Straub et al. |
| 5,905,800 A | 5/1999 | Moskowitz et al. |
| 5,907,838 A | 5/1999 | Miyasaka et al. |
| 5,913,040 A | 6/1999 | Rakavy et al. |
| 5,918,012 A | 6/1999 | Astiz et al. |
| 5,918,013 A | 6/1999 | Mighdoll et al. |
| 5,918,014 A | 6/1999 | Robinson |
| 5,918,214 A | 6/1999 | Perkowski |
| 5,920,697 A | 7/1999 | Masters et al. |
| 5,923,845 A | 7/1999 | Kamiya et al. |
| 5,923,853 A | 7/1999 | Danneels |
| 5,929,850 A | 7/1999 | Broadwin et al. |
| 5,930,446 A | 7/1999 | Kanda |
| 5,930,700 A | 7/1999 | Pepper et al. |
| 5,930,801 A | 7/1999 | Falkenhainer et al. |
| 5,931,901 A | 8/1999 | Wolfe et al. |
| 5,931,907 A | 8/1999 | Davies et al. |
| 5,933,811 A | 8/1999 | Angles et al. |
| 5,933,832 A | 8/1999 | Suzuoka et al. |
| 5,936,679 A | 8/1999 | Kasahara et al. |
| 5,937,037 A | 8/1999 | Kamel et al. |
| 5,937,390 A | 8/1999 | Hyodo |
| 5,937,392 A | 8/1999 | Alberts |
| 5,937,411 A | 8/1999 | Becker |
| 5,943,478 A | 8/1999 | Aggarwal et al. |
| 5,944,791 A | 8/1999 | Scherpbier |
| 5,946,646 A | 8/1999 | Schena et al. |
| 5,946,664 A | 8/1999 | Ebisawa |
| 5,946,697 A | 8/1999 | Shen |
| 5,948,061 A | 9/1999 | Merriman et al. |
| 5,951,300 A | 9/1999 | Brown |
| 5,956,693 A | 9/1999 | Geerlings |
| 5,956,716 A | 9/1999 | Kenner et al. |
| 5,958,008 A | 9/1999 | Pogrebisky et al. |
| 5,958,015 A | 9/1999 | Dascalu |
| 5,959,621 A | 9/1999 | Nawaz et al. |
| 5,959,623 A | 9/1999 | Van Hoff et al. |
| 5,960,409 A | 9/1999 | Wexler |
| 5,961,593 A | 10/1999 | Gabber et al. |
| 5,961,602 A | 10/1999 | Thompson et al. |
| 5,961,603 A | 10/1999 | Kunkel et al. |
| 5,963,909 A | 10/1999 | Warren et al. |
| 5,963,915 A | 10/1999 | Kirsch |
| 5,966,121 A | 10/1999 | Hubbell et al. |
| 5,970,473 A | 10/1999 | Gerszber et al. |
| 5,974,219 A | 10/1999 | Fujita et al. |
| 5,974,451 A | 10/1999 | Simmons |
| 5,978,807 A | 11/1999 | Mano et al. |
| 5,978,833 A | 11/1999 | Pashley et al. |
| 5,978,836 A | 11/1999 | Ouchi |
| 5,978,841 A | 11/1999 | Berger |
| 5,978,842 A | 11/1999 | Noble et al. |
| 5,983,227 A | 11/1999 | Nazem et al. |
| 5,983,244 A | 11/1999 | Nation |
| 5,983,268 A | 11/1999 | Freivald et al. |
| 5,987,466 A | 11/1999 | Greer et al. |
| 5,987,606 A | 11/1999 | Cirasole et al. |
| 5,991,735 A | 11/1999 | Gerace |
| 5,991,799 A | 11/1999 | Yen et al. |
| 5,995,597 A | 11/1999 | Woltz et al. |
| 5,995,943 A | 11/1999 | Bull et al. |
| 5,996,007 A | 11/1999 | Klug et al. |
| 5,996,011 A | 11/1999 | Humes |
| 5,999,526 A | 12/1999 | Garland et al. |
| 5,999,731 A | 12/1999 | Yellin et al. |
| 5,999,740 A | 12/1999 | Rowley |
| 5,999,912 A | 12/1999 | Wodarz et al. |
| 6,002,401 A | 12/1999 | Baker |
| 6,006,241 A | 12/1999 | Purnaveja et al. |
| 6,006,252 A | 12/1999 | Wolfe |
| 6,006,265 A | 12/1999 | Mishima et al. |
| 6,009,236 A | 12/1999 | Mishima et al. |
| 6,009,409 A | 12/1999 | Adler et al. |
| 6,009,410 A | 12/1999 | LeMole et al. |
| 6,011,537 A | 1/2000 | Slotznick |
| 6,012,083 A | 1/2000 | Savitzky et al. |
| 6,014,502 A | 1/2000 | Moraes |
| 6,014,638 A | 1/2000 | Burge et al. |
| 6,014,698 A | 1/2000 | Griffiths |
| 6,014,711 A | 1/2000 | Brown |
| 6,016,509 A | 1/2000 | Dedrick |
| 6,020,884 A | 2/2000 | MacNaughton et al. |
| 6,023,726 A | 2/2000 | Saksena |
| 6,025,837 A | 2/2000 | Matthews, III et al. |
| 6,025,886 A | 2/2000 | Koda |
| 6,026,368 A | 2/2000 | Brown et al. |
| 6,026,413 A | 2/2000 | Challenger et al. |
| 6,026,433 A | 2/2000 | D'arlach et al. |
| 6,026,933 A | 2/2000 | King et al. |
| 6,029,045 A | 2/2000 | Picco et al. |
| 6,029,141 A | 2/2000 | Bezos et al. |
| 6,029,145 A | 2/2000 | Barritz et al. |
| 6,029,182 A | 2/2000 | Nehab et al. |
| 6,029,195 A | 2/2000 | Herz |
| 6,035,332 A | 3/2000 | Ingrassia, Jr. et al. |
| 6,047,318 A | 4/2000 | Becker et al. |
| 6,047,327 A | 4/2000 | Tso et al. |
| 6,049,821 A | 4/2000 | Theriault et al. |
| 6,052,709 A | 4/2000 | Paul |
| 6,052,717 A | 4/2000 | Reynolds et al. |
| 6,052,730 A | 4/2000 | Felciano et al. |
| 6,055,572 A | 4/2000 | Saksena |
| 6,058,141 A | 5/2000 | Barger et al. |
| 6,061,054 A | 5/2000 | Jolly |
| 6,061,659 A | 5/2000 | Murray |
| 6,061,716 A | 5/2000 | Moncreiff |
| 6,065,024 A | 5/2000 | Renshaw |
| 6,065,056 A | 5/2000 | Bradshaw et al. |
| 6,067,559 A | 5/2000 | Allard et al. |
| 6,067,561 A | 5/2000 | Dillon |
| 6,067,565 A | 5/2000 | Horvitz |
| 6,070,140 A | 5/2000 | Tran |
| 6,073,105 A | 6/2000 | Sutcliffe et al. |
| 6,073,167 A | 6/2000 | Poulton et al. |
| 6,073,241 A | 6/2000 | Rosenberg et al. |
| 6,076,166 A | 6/2000 | Moshfeghi et al. |
| 6,078,916 A | 6/2000 | Culliss |
| 6,081,840 A | 6/2000 | Zhao |
| 6,084,581 A | 7/2000 | Hunt |
| 6,085,193 A | 7/2000 | Malkin et al. |
| 6,085,226 A | 7/2000 | Horvitz |
| 6,085,242 A | 7/2000 | Chandra |
| 6,088,731 A | 7/2000 | Kiraly et al. |
| 6,091,411 A | 7/2000 | Straub et al. |
| 6,092,196 A | 7/2000 | Reiche |
| 6,094,655 A | 7/2000 | Rogers et al. |
| 6,094,677 A | 7/2000 | Capek et al. |
| 6,098,064 A | 8/2000 | Pirolli et al. |
| 6,098,065 A | 8/2000 | Skillen et al. |
| 6,101,510 A | 8/2000 | Stone et al. |
| 6,108,637 A | 8/2000 | Blumenau |
| 6,108,691 A | 8/2000 | Lee et al. |
| 6,108,799 A | 8/2000 | Boulay et al. |
| 6,112,215 A | 8/2000 | Kaply |
| 6,112,246 A | 8/2000 | Horbal et al. |
| 6,115,680 A | 9/2000 | Coffee et al. |
| 6,119,098 A | 9/2000 | Guyot et al. |
| 6,119,165 A | 9/2000 | Li et al. |
| 6,122,632 A | 9/2000 | Botts et al. |
| 6,125,388 A | 9/2000 | Reisman |

| Patent No. | Kind | Date | Inventor |
|---|---|---|---|
| 6,128,655 | A | 10/2000 | Fields et al. |
| 6,128,663 | A | 10/2000 | Thomas |
| 6,133,912 | A | 10/2000 | Montero |
| 6,133,918 | A | 10/2000 | Conrad et al. |
| 6,134,380 | A | 10/2000 | Kushizaki |
| 6,134,532 | A | 10/2000 | Lazarus et al. |
| 6,138,146 | A | 10/2000 | Moon et al. |
| 6,138,155 | A | 10/2000 | Davis et al. |
| 6,141,010 | A | 10/2000 | Hoyle |
| 6,144,596 | A | 11/2000 | Hosomi |
| 6,144,944 | A | 11/2000 | Kurtzman, II et al. |
| 6,151,596 | A | 11/2000 | Hosomi |
| 6,154,738 | A | 11/2000 | Call |
| 6,154,771 | A | 11/2000 | Rangan et al. |
| 6,157,924 | A | 12/2000 | Austin |
| 6,157,946 | A | 12/2000 | Itakura et al. |
| 6,161,112 | A | 12/2000 | Cragun et al. |
| 6,163,778 | A * | 12/2000 | Fogg et al. .................. 707/10 |
| 6,167,438 | A | 12/2000 | Yates et al. |
| 6,167,453 | A | 12/2000 | Becker et al. |
| 6,178,443 | B1 | 1/2001 | Lin |
| 6,178,461 | B1 | 1/2001 | Chan et al. |
| 6,182,066 | B1 | 1/2001 | Marques |
| 6,182,097 | B1 | 1/2001 | Hansen et al. |
| 6,182,122 | B1 | 1/2001 | Berstis |
| 6,182,133 | B1 | 1/2001 | Horvitz |
| 6,183,366 | B1 | 2/2001 | Goldberg et al. |
| 6,185,558 | B1 | 2/2001 | Bowman et al. |
| 6,185,586 | B1 | 2/2001 | Judson |
| 6,185,614 | B1 | 2/2001 | Cuomo et al. |
| 6,191,782 | B1 | 2/2001 | Mori et al. |
| 6,192,380 | B1 | 2/2001 | Light et al. |
| 6,195,622 | B1 | 2/2001 | Altschuler et al. |
| 6,198,906 | B1 | 3/2001 | Boetje et al. |
| 6,199,079 | B1 | 3/2001 | Gupta et al. |
| 6,202,093 | B1 | 3/2001 | Bolam et al. |
| 6,204,840 | B1 | 3/2001 | Petelycky et al. |
| 6,208,339 | B1 | 3/2001 | Atlas et al. |
| 6,216,141 | B1 | 4/2001 | Straub et al. |
| 6,216,212 | B1 | 4/2001 | Challenger et al. |
| 6,219,676 | B1 | 4/2001 | Reiner |
| 6,222,520 | B1 | 4/2001 | Gerszberg et al. |
| 6,223,215 | B1 | 4/2001 | Hunt et al. |
| 6,233,564 | B1 | 5/2001 | Schulze, Jr. |
| 6,237,022 | B1 | 5/2001 | Bruck et al. |
| 6,249,284 | B1 | 6/2001 | Bogdan |
| 6,253,188 | B1 | 6/2001 | Witek et al. |
| 6,253,208 | B1 | 6/2001 | Wittgreffe et al. |
| 6,266,058 | B1 | 7/2001 | Meyer |
| 6,269,361 | B1 | 7/2001 | Davis et al. |
| 6,275,854 | B1 | 8/2001 | Himmel et al. |
| 6,279,112 | B1 | 8/2001 | O'Toole et al. |
| 6,280,043 | B1 | 8/2001 | Ohkawa |
| 6,285,987 | B1 | 9/2001 | Roth et al. |
| 6,286,043 | B1 | 9/2001 | Cuomo et al. |
| 6,286,045 | B1 | 9/2001 | Griffiths et al. |
| 6,295,061 | B1 | 9/2001 | Park et al. |
| 6,297,819 | B1 | 10/2001 | Furst |
| 6,304,844 | B1 | 10/2001 | Pan et al. |
| 6,308,202 | B1 | 10/2001 | Cohn et al. |
| 6,311,194 | B1 | 10/2001 | Sheth et al. |
| 6,314,451 | B1 | 11/2001 | Landsman et al. |
| 6,314,457 | B1 | 11/2001 | Schema et al. |
| 6,317,761 | B1 | 11/2001 | Landsman et al. |
| 6,321,209 | B1 | 11/2001 | Pasquali |
| 6,321,256 | B1 | 11/2001 | Himmel et al. |
| 6,324,553 | B1 | 11/2001 | Cragun et al. |
| 6,324,569 | B1 | 11/2001 | Ogilvie et al. |
| 6,324,583 | B1 | 11/2001 | Stevens |
| 6,327,574 | B1 | 12/2001 | Kramer et al. |
| 6,327,617 | B1 | 12/2001 | Fawcett |
| 6,332,127 | B1 | 12/2001 | Bandera |
| 6,334,111 | B1 | 12/2001 | Carrott |
| 6,335,963 | B1 | 1/2002 | Bosco |
| 6,336,131 | B1 | 1/2002 | Wolfe |
| 6,338,059 | B1 | 1/2002 | Fields et al. |
| 6,338,066 | B1 | 1/2002 | Martin et al. |
| 6,341,305 | B2 | 1/2002 | Wolfe |
| 6,347,398 | B1 | 2/2002 | Parthasarathy et al. |
| 6,351,279 | B1 | 2/2002 | Sawyer |
| 6,351,745 | B1 | 2/2002 | Itakura et al. |
| 6,353,834 | B1 | 3/2002 | Wong et al. |
| 6,356,898 | B2 | 3/2002 | Cohen et al. |
| 6,356,908 | B1 | 3/2002 | Brown et al. |
| 6,360,221 | B1 | 3/2002 | Gough et al. |
| 6,366,298 | B1 | 4/2002 | Haitsuka |
| 6,370,527 | B1 | 4/2002 | Singhal |
| 6,377,983 | B1 | 4/2002 | Cohen et al. |
| 6,378,075 | B1 | 4/2002 | Goldstein et al. |
| 6,381,735 | B1 | 4/2002 | Hunt |
| 6,381,742 | B2 | 4/2002 | Forbes et al. |
| 6,385,592 | B1 | 5/2002 | Angles et al. |
| 6,392,668 | B1 | 5/2002 | Murray |
| 6,393,407 | B1 | 5/2002 | Middleton et al. |
| 6,393,415 | B1 | 5/2002 | Getchius et al. |
| 6,397,228 | B1 | 5/2002 | Lamburt et al. |
| 6,401,075 | B1 | 6/2002 | Mason et al. |
| 6,415,322 | B1 | 7/2002 | Jaye |
| 6,418,440 | B1 | 7/2002 | Kuo et al. |
| 6,418,471 | B1 | 7/2002 | Shelton et al. |
| 6,421,675 | B1 | 7/2002 | Ryan et al. |
| 6,421,724 | B1 | 7/2002 | Nickerson et al. |
| 6,421,729 | B1 | 7/2002 | Paltenghe et al. |
| 6,434,745 | B1 | 8/2002 | Conley, Jr. et al. |
| 6,437,802 | B1 | 8/2002 | Kenny |
| 6,438,215 | B1 | 8/2002 | Skladman et al. |
| 6,438,578 | B1 | 8/2002 | Schmid et al. |
| 6,438,579 | B1 | 8/2002 | Hosken |
| 6,441,832 | B1 | 8/2002 | Tao et al. |
| 6,442,529 | B1 | 8/2002 | Krishan et al. |
| 6,446,128 | B1 | 9/2002 | Woods et al. |
| 6,449,657 | B2 | 9/2002 | Stanbach, Jr. et al. |
| 6,452,612 | B1 | 9/2002 | Holtz et al. |
| 6,457,009 | B1 | 9/2002 | Bollay |
| 6,459,440 | B1 | 10/2002 | Monnes et al. |
| 6,460,036 | B1 | 10/2002 | Herz |
| 6,460,042 | B1 | 10/2002 | Hitchcock et al. |
| 6,460,060 | B1 | 10/2002 | Maddalozzo et al. |
| 6,466,970 | B1 | 10/2002 | Lee et al. |
| 6,477,550 | B1 | 11/2002 | Balasubramaniam et al. |
| 6,477,575 | B1 | 11/2002 | Koeppel et al. |
| 6,480,837 | B1 * | 11/2002 | Dutta .................. 707/3 |
| 6,484,148 | B1 | 11/2002 | Boyd |
| 6,487,538 | B1 | 11/2002 | Gupta et al. |
| 6,490,722 | B1 | 12/2002 | Barton et al. |
| 6,493,702 | B1 | 12/2002 | Adar et al. |
| 6,496,931 | B1 | 12/2002 | Rajchel et al. |
| 6,499,052 | B1 | 12/2002 | Hoang et al. |
| 6,502,076 | B1 | 12/2002 | Smith |
| 6,505,201 | B1 | 1/2003 | Haitsuka et al. |
| 6,513,052 | B1 | 1/2003 | Binder |
| 6,513,060 | B1 | 1/2003 | Nixon et al. |
| 6,516,312 | B1 | 2/2003 | Kraft et al. |
| 6,523,021 | B1 | 2/2003 | Monberg et al. |
| 6,526,411 | B1 | 2/2003 | Ward |
| 6,529,903 | B2 | 3/2003 | Smith et al. |
| 6,539,375 | B2 | 3/2003 | Kawasaki |
| 6,539,424 | B1 | 3/2003 | Dutta |
| 6,564,202 | B1 | 5/2003 | Schuetze et al. |
| 6,567,850 | B1 | 5/2003 | Freishtat et al. |
| 6,567,854 | B1 | 5/2003 | Olshansky et al. |
| 6,570,595 | B2 | 5/2003 | Porter |
| 6,572,662 | B2 | 6/2003 | Manohar et al. |
| 6,584,479 | B2 | 6/2003 | Chang et al. |
| 6,584,492 | B1 | 6/2003 | Cezar et al. |
| 6,584,505 | B1 | 6/2003 | Howard et al. |
| 6,594,654 | B1 | 7/2003 | Salam et al. |
| 6,601,041 | B1 | 7/2003 | Brown et al. |
| 6,601,057 | B1 | 7/2003 | Underwood et al. |
| 6,601,100 | B2 | 7/2003 | Lee et al. |
| 6,604,103 | B1 | 8/2003 | Wolfe |
| 6,606,652 | B1 | 8/2003 | Cohn et al. |
| 6,622,168 | B1 | 9/2003 | Datta |
| 6,631,360 | B1 | 10/2003 | Cook |
| 6,615,247 | B1 | 11/2003 | Murphy |
| 6,642,944 | B2 | 11/2003 | Conrad et al. |
| 6,643,696 | B2 | 11/2003 | Davis et al. |
| 6,665,656 | B1 | 12/2003 | Carter |

| | | |
|---|---|---|
| 6,665,838 B1 | 12/2003 | Brown et al. |
| 6,678,731 B1 | 1/2004 | Howard et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,697,825 B1 | 2/2004 | Underwood et al. |
| 6,701,362 B1 | 3/2004 | Subramonian |
| 6,701,363 B1 | 3/2004 | Chiu et al. |
| 6,714,975 B1 | 3/2004 | Aggarwal et al. |
| 6,718,365 B1 * | 4/2004 | Dutta ............................ 709/203 |
| 6,721,741 B1 | 4/2004 | Eyal et al. |
| 6,721,795 B1 | 4/2004 | Eldreth |
| 6,725,269 B1 | 4/2004 | Megiddo |
| 6,725,303 B1 | 4/2004 | Hoguta et al. |
| 6,741,967 B1 | 5/2004 | Wu et al. |
| 6,757,661 B1 | 6/2004 | Blaser et al. |
| 6,760,746 B1 | 7/2004 | Schneider |
| 6,760,916 B2 | 7/2004 | Holtz et al. |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 | 10/2004 | Bates et al. |
| 6,801,909 B2 | 10/2004 | Delgado et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,880,123 B1 | 4/2005 | Landsman |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,226 B1 | 5/2005 | Tso et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,934,736 B2 | 8/2005 | Sears et al. |
| 6,938,027 B1 | 8/2005 | Barritz |
| 6,957,390 B2 | 10/2005 | Tamir et al. |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 6,990,633 B1 | 1/2006 | Miyasaka et al. |
| 6,993,532 B1 | 1/2006 | Platt et al. |
| 7,003,734 B1 | 2/2006 | Gardner et al. |
| 7,016,887 B2 | 3/2006 | Stockfisch |
| 7,039,599 B2 | 5/2006 | Merriman et al. |
| 7,043,526 B1 | 5/2006 | Wolfe |
| 7,051,084 B1 | 5/2006 | Hayton et al. |
| 7,054,900 B1 | 5/2006 | Goldston |
| 7,065,550 B2 | 6/2006 | Raghunandan |
| 7,069,515 B1 | 6/2006 | Eagle et al. |
| 7,076,546 B1 | 7/2006 | Bates et al. |
| 7,085,682 B1 | 8/2006 | Heller et al. |
| 7,100,111 B2 | 8/2006 | McElfresh et al. |
| 7,133,924 B1 | 11/2006 | Rosenberg et al. |
| 7,136,875 B2 | 11/2006 | Anderson et al. |
| 7,149,791 B2 | 12/2006 | Sears et al. |
| 7,155,729 B1 | 12/2006 | Andrew et al. |
| 7,162,739 B2 | 1/2007 | Cowden et al. |
| 7,181,415 B2 | 2/2007 | Blaser et al. |
| 7,181,488 B2 | 2/2007 | Martin et al. |
| 7,194,425 B2 | 3/2007 | Nyhan |
| 7,254,547 B1 | 8/2007 | Beck et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,424,708 B2 | 9/2008 | Andersson et al. |
| 7,451,065 B2 | 11/2008 | Pednault et al. |
| 7,454,364 B2 | 11/2008 | Shkedi |
| 7,464,155 B2 | 12/2008 | Mousavi et al. |
| 7,512,603 B1 | 3/2009 | Veteska et al. |
| 7,630,986 B1 | 12/2009 | Herz |
| 7,743,340 B2 | 6/2010 | Horvitz et al. |
| 7,844,488 B2 | 11/2010 | Merriman et al. |
| 2001/0011226 A1 | 8/2001 | Greer et al. |
| 2001/0029527 A1 | 10/2001 | Goshen |
| 2001/0030970 A1 | 10/2001 | Wiryaman et al. |
| 2001/0032115 A1 | 10/2001 | Goldstein |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0047354 A1 | 11/2001 | Davis et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002483 A1 | 1/2002 | Siegel et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0007317 A1 | 1/2002 | Callaghan et al. |
| 2002/0008703 A1 | 1/2002 | Merrill et al. |
| 2002/0010626 A1 | 1/2002 | Agmoni |
| 2002/0010757 A1 | 1/2002 | Granik et al. |
| 2002/0010776 A1 | 1/2002 | Lerner |
| 2002/0016736 A1 | 2/2002 | Cannon et al. |
| 2002/0019763 A1 | 2/2002 | Linden et al. |
| 2002/0019834 A1 | 2/2002 | Vilcauskas, Jr. et al. |
| 2002/0023159 A1 | 2/2002 | Vange et al. |
| 2002/0026390 A1 | 2/2002 | Ulenas et al. |
| 2002/0032592 A1 | 3/2002 | Krasnick et al. |
| 2002/0035568 A1 | 3/2002 | Benthin |
| 2002/0038363 A1 | 3/2002 | MacLean |
| 2002/0040374 A1 | 4/2002 | Kent |
| 2002/0042750 A1 | 4/2002 | Morrison |
| 2002/0046099 A1 | 4/2002 | Frengut et al. |
| 2002/0049633 A1 | 4/2002 | Paquali |
| 2002/0052785 A1 | 5/2002 | Tenenbaum |
| 2002/0052925 A1 | 5/2002 | Kim et al. |
| 2002/0053078 A1 | 5/2002 | Holtz et al. |
| 2002/0054089 A1 | 5/2002 | Nicholas |
| 2002/0055912 A1 | 5/2002 | Buck |
| 2002/0057285 A1 | 5/2002 | Nicholas, III |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0073079 A1 | 6/2002 | Terheggen |
| 2002/0077219 A1 | 6/2002 | Cohen et al. |
| 2002/0078076 A1 | 6/2002 | Evans |
| 2002/0078192 A1 | 6/2002 | Kopsell et al. |
| 2002/0087499 A1 | 7/2002 | Stockfisch |
| 2002/0087621 A1 | 7/2002 | Hendriks |
| 2002/0091700 A1 | 7/2002 | Steele et al. |
| 2002/0091875 A1 | 7/2002 | Fujiwara et al. |
| 2002/0094868 A1 | 7/2002 | Tuck et al. |
| 2002/0099605 A1 | 7/2002 | Weitzman et al. |
| 2002/0099767 A1 | 7/2002 | Cohen et al. |
| 2002/0099812 A1 | 7/2002 | Davis et al. |
| 2002/0099824 A1 | 7/2002 | Bender et al. |
| 2002/0103811 A1 | 8/2002 | Fankhauser et al. |
| 2002/0107847 A1 | 8/2002 | Johnson |
| 2002/0107858 A1 | 8/2002 | Lundahl et al. |
| 2002/0111910 A1 | 8/2002 | Walsh |
| 2002/0111994 A1 | 8/2002 | Raghunandan |
| 2002/0112035 A1 | 8/2002 | Carey et al. |

| | | |
|---|---|---|
| 2002/0112048 A1 | 8/2002 | Gruyer et al. |
| 2002/0116494 A1 | 8/2002 | Kocol |
| 2002/0120648 A1 | 8/2002 | Ball et al. |
| 2002/0122065 A1 | 9/2002 | Segal et al. |
| 2002/0123912 A1 | 9/2002 | Subramanian et al. |
| 2002/0128904 A1 | 9/2002 | Carruthers et al. |
| 2002/0128908 A1 | 9/2002 | Levin et al. |
| 2002/0128925 A1 | 9/2002 | Angeles |
| 2002/0152121 A1 | 10/2002 | Hiroshi |
| 2002/0152126 A1 | 10/2002 | Lieu et al. |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Krasnoiarov et al. |
| 2002/0169670 A1 | 11/2002 | Barsade et al. |
| 2002/0169762 A1 | 11/2002 | Cardona |
| 2002/0170068 A1 | 11/2002 | Rafey et al. |
| 2002/0171682 A1 | 11/2002 | Frank et al. |
| 2002/0175947 A1 | 11/2002 | Conrad et al. |
| 2002/0194151 A1 | 12/2002 | Fenton et al. |
| 2002/0198778 A1 | 12/2002 | Landsman et al. |
| 2003/0004804 A1 | 1/2003 | Landsman et al. |
| 2003/0005000 A1 | 1/2003 | Landsman et al. |
| 2003/0005067 A1 * | 1/2003 | Martin et al. .................. 709/207 |
| 2003/0005134 A1 | 1/2003 | Martin et al. |
| 2003/0011639 A1 | 1/2003 | Webb |
| 2003/0014304 A1 | 1/2003 | Calvert et al. |
| 2003/0014399 A1 | 1/2003 | Hansen et al. |
| 2003/0018778 A1 | 1/2003 | Martin et al. |
| 2003/0018885 A1 | 1/2003 | Landsman et al. |
| 2003/0023481 A1 | 1/2003 | Calvert et al. |
| 2003/0023488 A1 | 1/2003 | Landsman et al. |
| 2003/0023698 A1 | 1/2003 | Dieberger et al. |
| 2003/0028529 A1 | 2/2003 | Cheung et al. |
| 2003/0028565 A1 | 2/2003 | Landsman et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0040958 A1 | 2/2003 | Fernandes |
| 2003/0041050 A1 | 2/2003 | Smith et al. |
| 2003/0046150 A1 | 3/2003 | Ader et al. |
| 2003/0050863 A1 | 3/2003 | Radwin |
| 2003/0052913 A1 | 3/2003 | Barile |
| 2003/0074448 A1 | 4/2003 | Kinebuchi |
| 2003/0088554 A1 | 5/2003 | Ryan et al. |
| 2003/0105589 A1 | 6/2003 | Liu et al. |
| 2003/0110080 A1 | 6/2003 | Tsutani et al. |
| 2003/0115157 A1 | 6/2003 | Circenis |
| 2003/0120593 A1 | 6/2003 | Bansal et al. |
| 2003/0120654 A1 | 6/2003 | Edlund et al. |
| 2003/0131100 A1 | 7/2003 | Godon et al. |
| 2003/0135490 A1 | 7/2003 | Barrett et al. |
| 2003/0135853 A1 | 7/2003 | Goldman et al. |
| 2003/0154168 A1 | 8/2003 | Lautenbacher |
| 2003/0171990 A1 | 9/2003 | Rao et al. |
| 2003/0172075 A1 * | 9/2003 | Reisman ...................... 707/10 |
| 2003/0176931 A1 | 9/2003 | Pednault et al. |
| 2003/0182184 A1 | 9/2003 | Strasnick et al. |
| 2003/0195837 A1 | 10/2003 | Kostic et al. |
| 2003/0195877 A1 | 10/2003 | Ford |
| 2003/0206720 A1 | 11/2003 | Abecassis |
| 2003/0208472 A1 | 11/2003 | Pham |
| 2003/0220091 A1 | 11/2003 | Farrand et al. |
| 2003/0221167 A1 | 11/2003 | Goldstein et al. |
| 2003/0229542 A1 | 12/2003 | Morrisroe |
| 2004/0002896 A1 | 1/2004 | Alanen et al. |
| 2004/0024756 A1 * | 2/2004 | Rickard ........................ 707/3 |
| 2004/0030798 A1 | 2/2004 | Andersson et al. |
| 2004/0044677 A1 | 3/2004 | Huper-Graff et al. |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0117353 A1 | 6/2004 | Ishag |
| 2004/0133845 A1 | 7/2004 | Forstall et al. |
| 2004/0162738 A1 | 8/2004 | Sanders et al. |
| 2004/0162759 A1 | 8/2004 | Willis |
| 2004/0163101 A1 | 8/2004 | Swix et al. |
| 2004/0167926 A1 | 8/2004 | Anderson et al. |
| 2004/0167928 A1 | 8/2004 | Anderson et al. |
| 2004/0181525 A1 | 9/2004 | Itzhak et al. |
| 2004/0181604 A1 | 9/2004 | Immonen |
| 2004/0193488 A1 | 9/2004 | Khoo et al. |
| 2004/0210533 A1 | 10/2004 | Picker et al. |
| 2004/0225716 A1 | 11/2004 | Shamir et al. |
| 2004/0247748 A1 | 12/2004 | Bronkema |
| 2004/0249709 A1 | 12/2004 | Donovan et al. |
| 2004/0249938 A1 | 12/2004 | Bunch |
| 2004/0254810 A1 | 12/2004 | Yamaga et al. |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027821 A1 | 2/2005 | Alexander et al. |
| 2005/0027822 A1 | 2/2005 | Plaza |
| 2005/0033657 A1 | 2/2005 | Herrington et al. |
| 2005/0038819 A1 | 2/2005 | Hicken et al. |
| 2005/0080772 A1 | 4/2005 | Bem |
| 2005/0086109 A1 | 4/2005 | McFadden et al. |
| 2005/0091106 A1 | 4/2005 | Reller et al. |
| 2005/0091111 A1 | 4/2005 | Green et al. |
| 2005/0097088 A1 | 5/2005 | Bennett et al. |
| 2005/0102202 A1 | 5/2005 | Linden et al. |
| 2005/0102282 A1 | 5/2005 | Linden |
| 2005/0131762 A1 | 6/2005 | Bharat et al. |
| 2005/0132267 A1 | 6/2005 | Aviv |
| 2005/0149404 A1 | 7/2005 | Barnett et al. |
| 2005/0155031 A1 | 7/2005 | Wang et al. |
| 2005/0182773 A1 | 8/2005 | Feinsmith |
| 2005/0187823 A1 | 8/2005 | Howes |
| 2005/0203796 A1 | 9/2005 | Anand et al. |
| 2005/0204148 A1 | 9/2005 | Mayo et al. |
| 2005/0216572 A1 | 9/2005 | Tso et al. |
| 2005/0222901 A1 | 10/2005 | Agarwal et al. |
| 2005/0222982 A1 * | 10/2005 | Paczkowski et al. ............. 707/3 |
| 2005/0240599 A1 | 10/2005 | Sears |
| 2005/0273463 A1 | 12/2005 | Zohar et al. |
| 2005/0289120 A9 | 12/2005 | Soulanille et al. |
| 2006/0015390 A1 | 1/2006 | Rijsinghani et al. |
| 2006/0026233 A1 | 2/2006 | Tenembaum et al. |
| 2006/0031253 A1 | 2/2006 | Newbold et al. |
| 2006/0053230 A1 | 3/2006 | Montero |
| 2006/0136524 A1 | 6/2006 | Wohlers et al. |
| 2006/0136528 A1 | 6/2006 | Martin et al. |
| 2006/0136728 A1 | 6/2006 | Gentry et al. |
| 2006/0235965 A1 | 10/2006 | Bennett et al. |
| 2006/0253432 A1 | 11/2006 | Eagle et al. |
| 2007/0016469 A1 | 1/2007 | Bae et al. |
| 2007/0038956 A1 | 2/2007 | Morris |

FOREIGN PATENT DOCUMENTS

| | | |
|---|---|---|
| EP | 0822535 | 2/1998 |
| EP | 1045547 | 10/2000 |
| EP | 1154611 | 11/2001 |
| EP | 1207468 A2 | 5/2002 |
| JP | 343825 | 2/1991 |
| JP | 11066099 | 3/1999 |
| JP | 2001084256 | 3/2001 |
| JP | 2001147894 | 5/2001 |
| JP | 20010222535 | 8/2001 |
| JP | 2001312482 | 11/2001 |
| JP | 2002024221 | 1/2002 |
| JP | 2002032401 | 1/2002 |
| JP | 2002073545 | 3/2002 |
| JP | 2002259371 | 9/2002 |
| JP | 2002334104 | 11/2002 |
| JP | 2003058572 | 2/2003 |
| JP | 2003141155 | 5/2003 |
| JP | 2003178092 | 6/2003 |
| JP | 20030271647 | 9/2003 |
| JP | 2004-355376 | 12/2004 |
| WO | WO 9847090 | 10/1998 |
| WO | WO 99/38321 | 7/1999 |
| WO | WO 99/44159 | 9/1999 |
| WO | WO 99/46701 | 9/1999 |
| WO | WO 99/55066 | 10/1999 |
| WO | WO 99/59097 | 11/1999 |

| | | |
|---|---|---|
| WO | WO 00/04434 | 1/2000 |
| WO | WO 00/54201 | 9/2000 |
| WO | WO 01/03028 | 1/2001 |
| WO | WO 01/15052 | 3/2001 |
| WO | WO 01/39024 A2 | 5/2001 |
| WO | WO 01/44992 | 6/2001 |
| WO | WO 01/63472 | 8/2001 |
| WO | WO 01/69929 | 9/2001 |
| WO | WO 01/90917 A2 | 11/2001 |
| WO | WO 02/44869 A2 | 6/2002 |
| WO | WO 03/010685 | 2/2003 |

OTHER PUBLICATIONS

Charu C et al., Intelligent crawling on the World Wide Web with arbitrary predicates, 2001, ACM, 96-105.*
Ke Hunet al., A probabilistic model for intelligent Web crawlers, 2003, IEEE, 278-282.*
Favela et al., Image-retrieval agent: integrating image content and text, 1999, IEEE, vol. 14, 36-39.*
Charu C. Aggarwal, Intelligent crawling on the World Wide Web with arbitrary predicates, 2001, ACM, 96-105.*
Ke Hunet al., A probabilistic model for intelligent Web crawlers, 2003, IEEE, 278-282.*
International Search Report and Written Opinion for PCT Application No. PCT/US05/35352 mailed on Sep. 11, 2007.
Dogpile, Dogpile Web Search Home Page, InfoSpace, Inc. 2004, p. 1 of 1, [retrieved on Apr. 1, 2004]. Retrieved from the internet: <URL:http://www.dogpile.com.html>.
Metacrawler, Web Search Home Page—MetaCrawler, InfoSpace, Inc. 2004, p. 1 of 1 [retrieved on Apr. 6, 2004]. Retrieved from the internet: <URL:http://www.metacrawler.com.html>.
Copernic, Copernic: Software to search, find, and manage information, Copernic Technologies, Inc. 2004, 2 pgs, [retrieved on Apr. 6, 2004]. Retrieved from the internet: <URL:http//www.copernic.com/en/index.html>, All Pages.
SideStep, The Traveler's Search Engine; Webpage [online] [retrived on Oct. 7, 2004]; retrieved from the internet: <URL:http://www.sidestep.com/main.html, All Pages.
Visual Search ToolBar—Graphically Enhance Search Results, 2004 Viewpoint Corporation; Webpage [online] [retrieved on Oct. 7, 2004]; retrieved from the internet: <URL:http://www.viewpoint.com/pub/toolbar/download.html, All Pages.
Shopping with WhenUShop, Webpage [on-line]; WhenU.com [retrieved on Mar. 19, 2002]. Retrieved from the internet: URL:http://www.whenu.com, All Pages.
European Search Report dated May 2, 2008 relating to EP Serial No. 05 802 579.2-1527, All Pages.
Hongyu Liu et al., "Focused Crawling by Learning HMM from User's Topic-Specific Browsing" Proceedings of the IEEE/WIC/ACM International Conference on Web Intelligence (WI '04) 0-7695-2100-2/04, 4 Pages.
Soumen Chakrabarti et al., "Focused Crawling: A New Approach to Top-Specific Web Resource Discovery" Computer Networks 31 (1999) pp. 1623-1640.
PCT International Search Report and Written Opinion of the International Searching Authority for International Application PCT/US05/29615, dated Feb. 20, 2006.
Payton, et al., "Dynamic Collaborator Discovery In Information Intensive Environments", ACM Computing Surveys, ACM, New York, NY, vol. 31, No. ZES, 1999, pp. 1-8.
Diligenti et al., "A Unified Probalistic Framework for Web Page Scoring Systems", Jan. 2004, IEEE, vol. 16, No. 1, pp. 4-16.
Leuski et al., "Lighthouse: Showing the Way to Relevant Information", Oct. 9-10, 2000, IEEE, pp. 125-129.
Non-final rejection dated Oct. 19, 2007 issued in U.S. Appl. No. 11/207,589.
Supplemental Notice of Allowability dated Aug. 7, 2008 issued in U.S. Appl. No. 11/207,589.
Non-final rejection dated Oct. 10, 2007 issued in U.S. Appl. No. 11/207,590.
Final rejection dated Oct. 16, 2008 issued in U.S. Appl. No. 11/207,590.
Non-final rejection dated Jun. 22, 2009 issued in U.S. Appl. No. 11/207,590.
Final rejection dated Mar. 26, 2010 issued in U.S. Appl. No. 11/207,590.
Non-final rejection dated Sep. 27, 2007 issued in U.S. Appl. No. 11/207,592.
Final rejection dated Jun. 24, 2008 issued in U.S. Appl. No. 11/207,592.
Non-final rejection dated Feb. 25, 2009 issued in U.S. Appl. No. 11/207,592.
Google Search, "Result Search Query Build Search Engine Index Using Gather Consumer Navigate Search", http://scholar.google.com/scholar, dated Apr. 7, 2010, 3 pages.
ACM Portal USPTO Search, "Communications of the ACM: vol. 52, Issue 1", Association for Computing Machinery, dated Jan. 2009, 1 page.
Non-Final Rejection dated Apr. 25, 2006 issue in U.S. Appl. No. 10/700,820.
Final Rejection dated Sep. 13, 2006 issue in U.S. Appl. No. 10/700,820.
Non-Final Rejection dated Dec. 26, 2006 issue in U.S. Appl. No. 10/700,820.
Final Rejection dated May 24, 2007 issue in U.S. Appl. No. 10/700,820.
BackWeb Technologies Ltd., BackWEB User's Guide, 1997, [48 pgs.].
Hancock, Wayland, "A new way to get information from the Internet," American Agent & Broker, Nov. 1997, 69, 11, pp. 65-66 [2 pgs.].
Japanese Patent Office, Official Action issued Dec. 17, 2010, mailed Dec. 27, 2010 in Japanese Patent Application No. 2007-528053 (non-official translation), 7 pgs.
NETSCAPE Communications Corp., Netcaster Developer's Guide, Netscape Communicator, Sep. 25, 1997 [112 pgs.].
Nilsson, B. A., and Robb, J., "Invasion of the Webcasters," PC World, vol. 15, No. 9 (Sep. 1997) p. 204-216 [9 pgs.].
Ad Close, Webpage [online]. C/net Downloads.com [retrieved on Oct. 4, 2001]. Retrieved from the Internet <URL http//download.cnet.com/downloads/0-10059-100-915154.html>.
Ad Muncher, Webpage [online]. C/net Downloads.com [retrieved on Oct. 4, 2001]. Retrieved from the Internet <URL:http//download.cnet.com/downloads/0-33567-18-100-2750044.html>.
AdDelete, Webpage [online]. C/net Download.com [retrieved on Oct. 4, 2001]. Retrieved.from the Internet <URL:http//download.cnet.com/downloads/0-10059-100-7003126.html>.
Adextinguisher-Introduction and News Sections. Webpage [online][retrieved on Oct. 4, 2001]. Retrieved from the Internet URL:http//adext.magenet.net.html.
AdPurger, Webpage [online]. C/net Downloads.com [retrieved on Oct. 4, 2001]. Retrieved from the Internet <URL:http//download.cnet.com/downloads/0-10068-100-5067717.html>.
AdsOff, Webpage [online]. C/net Downloads.com [retrieved on Oct. 3, 2001]. Retrieved from the Internet <URL:http//download.cnet.com/downloads/0-10059-100-9 12651.html>.
AdSubract SE, Webpage [online]. C/net Downloads.com [retrieved on Oct. 4, 2001]. Retrieved from the Internet <URL:http//download.cnet.com/downloads/0-3356727-100-5963713.html>.
Advertising Killer, Webpage [online]. C/net Downloads.com [retrieved on Oct. 3, 2001]. Retrieved from the Internet <URL.http//download.cnet.com/downloads/0-10059-100-1539520.html>.
Advisory Action dated Nov. 19, 2008 issued in U.S. Appl. No. 11/015,583, 3 pages.
AllGone, Webpage [online]. C/net Downloads.com [retrieved on Oct. 4, 2001]. Retrieved from the Internet <URL:http//download.cnet.com/downloads/0-10068-100-2915974.html>.
AnalogX Pow, Webpage [online]. C/net Downloads.com [retrieved on Oct. 3, 2001]. Retrieved from the Internet <URL:http//download.cnet com/downloads-0-3356748-100-915372.html>.
Banner Zapper, Webpage [online]. C/net Downloads.com [retrieved on Oct. 4, 2001]. Retrieved from the Internet <URL:http//download.cnet.com/downloads/0-3356727-100-6384611.html>.

BanPopup, Webpage [online]. C/net Downloads.com [retrieved on Oct. 4, 2001]. Retrieved from the Internet <URL:http//download.cnet.com/downloads/0-10059-100-6901908.html>.

Black List. Webpage [online]. C/net Downloads.com [retrieved on Oct. 4, 2001]. Retrieved from the Internet <URL.http/download cnet.com/downloads/0-10059-100902347 html>.

Claria—Company Information—Corporate Review, webpage [online], retrieved on Mar. 3, 2005, retrieved from the internet: <URL:http://www.claria.com/companyinfo.html>.

Close Popup 4.0, Webpage [online]. Take A Hike Software [retrieved on Oct. 4, 2001]. Retrieved from the Internet <URL:http//www.ryanware.com/close_popup.html>.

Close Popup, Webpage [online]. C/net Downloads.com [retrieved on Oct. 4, 2001]. Retrieved from the Internet <URL:http//download.cnet.com/downloads/0-10059-100-905799.html>.

CobraSoft PopStop, Webpage (online). C/net Downloads.com [retrieved on Oct. 4, 2001]. Retrieved from the Internet <URL:http//download cnet.com/downloads/0-10058-100-6926765.html>.

Compare Prices and Read Reviews on AdsOff! Epenions.com. Webpage [online]; Jan. 21, 2001. Obtained from corresponding International Application PCT Search Report.

CrushPop 2000, Webpage [online]. www.32bit.com [retrieved on Oct. 4, 2001]. Retrieved from the Internet <URL.http//32bit.com/software/listings/Internet/Special/180P/13794.html>.

Definition of "close button", Microsoft Press Computer Dictionary, 3rd ed. (Redmond WA: Microsoft Press, 1997).

DoubleClick products (17 total pgs); Webpage [online] [retrieved on Jun. 11, 2003]; Retrieved from the Internet: <URL: http://www.doubleclick.com>.

Final Office Action dated Mar. 26, 2010 issued in U.S. Appl. No. 11/207,590, 8 pages.

Final Rejection dated May 21, 2008 issued in U.S. Appl. No. 11/015,583, 8 pages.

Google search for "define: close button", Mar. 2, 2007.

Heller, Laura, "Target gets mod in Manhattan", DSNRetailing Today, v40 n16, Aug. 20, 2001: 2, 37.

InterMute, Webpage [online]. C/net Downloads.com [retrieved on Oct. 3, 2001]. Retrieved from the Internet <URL:http//download.cnet.com/downloads/0-10059-100-906599.html>.

International Preliminary Report on Patentability in PCT Appln. No. PCT/US2004/07714, dated Oct. 1, 2005 [4 pages].

Internet Citation: "Gator.com offers one-click shopping at over 5,000 e-commerce site today"; Jun. 14, 1999; XP002145278; Date retrieved: Jun. 28, 2001. URL:http://www.gator.com/company/press/pr061499b.html.

Kourbatov, Opening a Window, Jul. 8, 2000, plublished by www.javascripter.net, whole document.

Marcebra Net, Webpage [online]. C/net Downloads.com [retrieved on Oct. 4, 2001]. Retrieved from the Internet <URL:http//download.cnet.com/downloads/0-3364666-100-5210875.html>.

Mr. KillAd. Webpage [online]. C/net Downloads.com [retrieved on Oct. 4, 2001]. Retrieved from the Internet <URL:http//download.cnet.com/downloads/0-10059-100-895339 html>.

Nagger, Webpage [online]. C/net Downloads.com [retrieved on Oct. 4, 2001]. Retrieved from the Internet <URL:http//download.cnet.com/downloads/0-3356748-100-2497932 html>.

NoAds 2000.6.30.1, Webpage [online] south bay software [retrieved on Oct. 4, 2001]. Retrieved from the Internet <URL:http//www.southbaypc.com/NoAds.html>.

Non-Final Rejection dated Dec. 20, 2006 issued in U.S. Appl. No. 11/015,583, 8 pages.

Non-Final Rejection dated 'Jul. 20, 2009 issued in U.S. Appl. No. 11/015,583, 7 pages.

NoPops 1.1, Webpage [online]. WebAttack.com [retrieved on Oct. 4, 2001]. Retrieved from the Internet <URL:http//www.webattack.com/get/nopops.shtml>.

Paraben's AdStopper, Webpage [online]. C/net Downloads.com [retrieved on Oct. 4, 2001]. Retrieved from the Internet <URL:http//download.cnet.com/downloads/0-10059-100-2643648.html>.

PCT International Search Report for application No. PCT/US02/35981, 3 sheets; mailed Apr. 4, 2003.

PCT International Search Report for Application No. PCT/US04/09918.

PCT International Search Report re: International Application No. PCT/US05/29615 dated Feb. 20, 2006.

Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.

Popki Popup Closer 1.4, Webpage [online]. WebAttack.com [retrieved on Oct. 4, 2001]. Retrieved from the Internet <URL:http//www.webattack.com/get/popki.shtml>.

PopKill, Webpage [online]. C/net Downloads.com [retrieved on Oct. 4, 2001]. Retrieved from the Internet <URL:http//download.cnet.com/downloads/0-10059-100-6967054.html>.

PopNot, Webpage [online]. C/net Downloads.com [retrieved on Oct. 4, 2001]. Retrieved from the Internet <URL http//download.cnet.com/downloads/0-10059-100-5112702.html>.

PopUp Eraser, Webpage [online]. C/net Downloads.com [retrieved on Oct. 4, 2001]. Retrieved from the Internet <URL:http//download.cnet.com/downloads/0-10059-100-6322841.html>.

Popup Hunter, Webpage [online]. C/net Downloads.com [retrieved on Oct. 4, 2001]. Retrieved from the Internet <URL:http//download.cnet.com/downloads/0-10059-100-1451171.html>.

PopUp Killer, Webpage [online]. C/net Downloads.com [retrieved on Oct. 3, 2001]. Retrieved from the Internet <URL.http//download.cnet.com/downloads/0-10059-100-7253644 html>.

Popup Smasher, Webpage [online]. C/net Downloads.com [retrieved on Oct. 4, 2001]. Retrieved from the Internet <URL:http/download.cnet.com/downloads/0-3364664-100-7209048.html>.

Pop-up stopper, Webpage [online]. C/net Downloads.com [retrieved on Oct. 3, 2001]. Retrieved from the Internet <URL:http//download.cnet.com/downloads/0-10059-100-6803957.sub.--html&-gt.

PopupDummy, Webpage [online]. C/net Downloads.com [retrieved on Oct. 4, 2001]. Retrieved from the Internet <URL:http//download.cnet.com/downloads/0-10059-100-6943327.html>.

Ready, Kevin et al., "Plug-n-Play Java Script" (Indianapolis, IN: New Riders Publishing, 1996): 19-22, 39, 40 and 43-45.

Restriction Requirement dated Oct. 31, 2007 issued in U.S. Appl. No. 11/015,583, 6 pages.

Surf in Peace 2.01, Webpage [online]. WebAttack.com [retrieved on Oct. 4, 2001]. Retrieved from the Internet <URL:http//www.webattack.com/get/sip.shtml>.

U.S. Appl. No. 09/993,887, filed on Nov. 27, 2001, by Jax B. Cowden, et al.

U.S. Appl. No. 09/993,904, filed on Nov. 27, 2001, by Jax B. Cowden, et al.

U.S. Appl. No. 09/993,906, filed on Nov. 27, 2001, by Jax B. Cowden, et al.

U.S. Appl. No. 11/210,209—Oct. 16, 2007 Office Action.

U.S. Appl. No. 11/211,197—Jun. 23, 2006 PTO Office Action.

US. Appl. No. 09/993,888, filed on Nov. 27, 2001, by Mark E. Pennell, et al.

Web Magician, Webpage [online]. RocketDownLoad.com [retrieved on Oct. 4, 2001]. Retrieved from the Internet <URL:http/www.rocketdownload.com/Details/Inte/webmag.html>.

Written Opinion in PCT Appln. No. PCT/US2004/07714, mailed Mar. 31, 2005 [3 pages].

Zero Popup, Webpage [online]. C/net Downloads.com [retrieved on Oct. 4, 2001]. Retrieved from the Internet <URL:http//download.cnet.com/downloads/0-3356748-100-7163307.html>.

Directive 2002/58/EC of the European Parliament and of the Council of Jul. 12, 2002 concerning the processing of personal data and the protection of privacy in the electronic communications sector (Directive on privacy and electronic communications), Official Journal L 201, Jun. 31, 2002 p. 0037-0047 (downloaded.

International Search Report in PCT Appln. No. PCT/US2004/07714, mailed Mar. 31, 2005 [1 page].

Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May, 1999 (in Conf. Proc. 8th Int'l WWW Conf., Toronto, Canada, May 11-14, 1999).

Privacy and Electronic Communications (EC Directive) Regulations 2003 (PECR), No. 2426, Electronic Communication, Sep. 2003.

U.S. Appl. No. 11/427,243—May 10, 2011 PTO Office Action.

Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.

Bae, Sung Min, et al., "Fuzzy Web Ad Selector", IEEE Intelligent Systems, vol. 18 Issue 6, Nov./Dec. 2003, pp. 62-69.

Broder, Alan J., "Data Mining the Internet and Privacy", WEBKDD '99, LNAI 1836, Springer-Verlag, Berlin, Germany, (c) 2000, pp. 56-73.

Bucklin, Randolph E., et al., "Choice and the Internet: From Clickstream to Research Stream", Marketing Letters, vol. 13, No. 3, Aug. 2002, pp. 245-258.

Claypool, et al., Inferring User Interest, Worcester Polytechnic Inst., IEEE Internet Computing, Nov.-Dec. 2001, pp. 32-39 [8 pgs.].

Codelifter.Com: JavaScript Index Windows and Frames. [online] [retrieved on Dec. 19, 2005]. Retrieved from the internet<URL://http://www.codelifter.com/main/javascript/index_windowframes.html>.

comScore Marketing Solutions and Media Metrix (9 sheets), webpage) online), 2003 comScore Networks, Inc. (retrieved on Oct. 8, 2003), retrieved from the internet: <URL:http://vAvw.comscore.com>.

Eick, Stephen G., "Visual Analysis of Website Browsing Patterns", Visual Interfaces to Digital Libraries, Springer-Verlag, Berlin, Germany, (c) 2002, pp. 65-77.

Eirinaki, Magdalini, et al., "Web Mining for Web Personalization", ACM Transactions on Internet Technology (TOIT), vol. 3, Issue 1, Feb. 2003, pp. 1-27.

EPO Communication in European Appln. No. 02778589, completed Dec. 21, 2005 (2 Sheets).

EPO Communication in European Appln. No. 04795209, mailed Feb. 17, 2011 [160 pages].

EPO Communication in European Appln. No. 04795209, mailed Feb. 17, 2011 [4 pages].

EPO File History of EP 2004795209, downloaded from European Patent Office on Apr. 13, 2011 [164 pgs.].

EPO, Communication for EP 03 75 5344, Feb. 14, 2011 [4 pgs.].

EPO, File history of EP-03755344.3, Method and Apparatus for Displaying Messages in Computer Systems, as of Feb. 21, 2011 [121 pgs].

EPO, File history of EP 2004794999, downloaded from EPO Apr. 13, 2011 [204 pgs.].

EPO, File history of EP1714221 (downloaded from EPO on Apr. 13, 2011) [139 pages].

EPO, Supplementary European Search Report for EP 03 75 5344, Jun. 30, 2009, mailed Jul. 10, 2009 [2 pgs.].

European Search Report for Application No. EP 06 01 3103 (2 sheets).

Fenstermacher, Kurt D., et al., "Client-Side Monitoring for Web Mining", Journal of the American Society for Information Science and Technology, vol. 54, Issue 7, May 2003, pp. 625-637.

Fenstermacher, Kurt D., et al., "Mining Client-Side Activity for Personalization", WECWIS 2002, (c) 2002, pp. 205-212.

Friedman, Batya, et al., "Informed Consent in the Mozilla Browser: Implementing Value-Sensitive Design", HICSS-35 '02, Jan. 2002, pp. 10-19.

Fu, Xiaobin, et al., "Mining Navigation History for Recommendation", IUI 2000, New Orleans, LA, (c) 2000, pp. 106-112.

Gralla, Preston, How the Internet Works, Special Edition, Ziff-Davis Press, Emeryville, CA, .(c) 1997, pp. 254 and 266-271.

Greening, Dan R., "Tracking Users: What Marketers Really Want to Know", Web Techniques, Jul. 1999, downloaded from: www.webtechniques.com/archives/1999/07/, pp. 1-9.

Heinle et al. 1997. Designing with JavaScript: Creating Dynamic Web Pages. Sep. 1997, pp. 1-33, 46, 83 [Cited by EPO as "A" reference for EP 02 77 8589 in Supplementary European Search Report dated Dec. 21, 2005].

International Preliminary Report on Patentability and Written Opinion in PCT Appln. No. PCT/US2004/033777, mailed Jan. 19, 2006.

International Preliminary Report on Patentability and Written Opinion in PCT Appln. No. PCT/US2005/001022, dated Apr. 26, 2006.

International Preliminary Report on Patentability and Written Opinion in PCT Appln. No. PCT/US2005/035352, mailed Sep. 11, 2007.

International Preliminary Report on Patentability and Written Opinion in PCT Appln. No. PCT/US2006/009954, mailed Aug. 30, 2006.

International Preliminary Report on Patentability and Written Opinion in PCT Appln. No. PCT/US2006/025102, mailed Jul. 26, 2007.

International Preliminary Report on Patentability and Written Opinion in PCT Appln. No. PCT/US2006/25104, mailed Jan. 23, 2007.

International Preliminary Report on Patentability and Written Opinion in PCT Appln. No. PCT/US2007/061944, mailed Feb. 14, 2008.

International Preliminary Report on Patentability in PCT Appln. No. PCT/US2006/008049, dated Nov. 6, 2007.

International Preliminary Report on Patentability in PCT Appln. No. PCT/US2006/008050, dated Nov. 6, 2007.

International Preliminary Report on Patentability in PCT Appln. No. PCT/US2006/025103, dated Mar. 24, 2009.

International Search Report and Written Opinion in PCT Appln. No. PCT/US2006/008049, mailed Oct. 19, 2007.

International Search Report and Written Opinion in PCT Appln. No. PCT/US2006/008050, mailed on Oct. 19, 2007.

International Search Report and Written Opinion of the International Search Authority for Intl. Appl. No. PCT/US05/45722 mailed Jan. 19, 2007.

International Search Report and Wrtitten Opinion in PCT Appln. No. PCT/US2006/025103, mailed Jan. 29, 2008.

International Search Report in PCT Appln. No. PCT/US2004/033777, mailed Jan. 19, 2006.

International Search Report in PCT Appln. No. PCT/US2005/001022, mailed Apr. 24, 2006.

International Search Report in PCT Appln. No. PCT/US2006/009954, mailed Aug. 30, 2006.

International Search Report in PCT Appln. No. PCT/US2006/025102, mailed Jul. 26, 2007.

International Search Report in PCT Appln. No. PCT/US2006/25104, mailed Jan. 23, 2007.

International Search Report in PCT Appln. No. PCT/US2007/061944, mailed Feb. 14, 2008.

IRTORG—Internet Related Technologies: "irt.org—JavaScript Windows FAQ Knowledge Base" Internet Article, Online! Jun. 3, 2000, XP002360403, Retrieved from the Internet : URL:http://web.archive.org/web/20000619232700/developer.irt.org/script/window.htm> (retrieved on Dec. 19, 2005).

Ishitani, Lucila, et al., "Masks: Bringing Anonymity and Personalization Together", IEEE Security & Privacy, vol. 1, Issue 3, May/Jun. 2003, pp. 18-23.

Japanese Patent Office, Office Action mailed Jul. 26, 2010 from Japanese Serial No. JP2008-519504 filed Jun. 28, 2006.

Keys. 1998. Every Possible Internet Advertisement Drastic Increase of Click Through Rate by Interactivity and Multimedia. Nikkei Internet Technology. Dec. 22, 1998. January Issue (1999), vol. 18, pp. 118-127.

KIPO, Official Action in Korean Patent Appln. No. 10-2006-7008977.

Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.

Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.

Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.

Lee, Ching-Cheng, et al., "Category-Based Web Personalization System", COMPSAC 2001, Oct. 8-12, 2001, pp. 621-625.

Liu, Jian-Guo, et al., "Web Mining for Electronic Business Application", PDCAT 2003, Aug. 27-29, 2003, pp. 872-876.

Liu, Jian-Guo, et al., "Web Usage Mining for Electronic Business Applications", Machine Learning and Cybernetics, Shanghai, China, Aug. 2004, pp. 1314-1318.

Lu, Hongjun, et al., "Extending a Web Browser with Client-Side Mining", APWeb 2003, LNCS 2642, Springer-Verlag, Berlin, Germany, (c) 2003, pp. 166-177.

Luxenburger, Julia, et al., "Query-Log Based Authority Analysis for Web Information Search", WISE 2004, LNCS 3306, Springer-Verlag, Berlin, Germany, Nov. 1, 2004, pp. 90-101.
Mitchell, T., "Decision Tree Learning Based on Machine Learning" (Apr. 5, 2003), lecture slides for textbook Machine Learning, McGraw Hill, 1997, pp. 46-74 [29 pgs.].
Mobasher, Bamshad, et al., "Automatic Personalization Based on Web Usage Mining", Communications of the ACM, vol. 43, Issue 8, Aug. 2000, pp. 142-151.
Montgomery, Alan et al., Learning About Customers Without Asking, Carnegie Mellon University, Tepper School of Business, Jan. 2002 [35 pgs.].
NielsenllNetRatings (24 sheets), webpage online), 2003 NetRatings, Inc. (retrieved on Oct. 8, 2003), retrieved from the internet: <URL:http://www.nielsen-netratings.com>.
Office Action mailed Feb 2, 2010 from European Serial No. 06013103.4 filed Jun. 16, 2006.
Office Action mailed Nov. 2, 2005 from U.S. Appl. No. 10/061,107, filed Jan. 25, 2002.
Office Action mailed Aug. 3, 2009 from U.S. Appl. No. 11/427,226, filed Jun. 28, 2006.
Office Action mailed Feb. 4, 2010 from U.S. Appl. No. 11/427,243, filed Jun. 28, 2006.
Office Action mailed Jun. 7, 2010 from U.S. Appl. No. 11/427,226, filed Jun. 28, 2006.
Office Action mailed Dec. 8, 2008 from U.S. Appl. No. 11/427,243, filed Jun. 28, 2006.
Office Action mailed Aug. 10, 2009 from U.S. Appl. No. 11/427,282, filed Jun. 28, 2006.
Office Action mailed May 12, 2008 from U.S. Appl. No. 11/427,243, filed Jun. 28, 2006.
Office Action mailed Oct. 12, 2010 from U.S. Appl. No. 11/427,243, filed Jun. 28, 2006.
Office Action mailed Aug. 13, 2003 from U.S. Appl. No. 10/061,107, filed Jan. 25, 2002.
Office Action mailed Jan. 14, 2004 in U.S. Appl. No. 10/061,107, filed Jan. 25, 2002.
Office Action mailed Sep. 16, 2004 from U.S. Appl. No. 10/056,932, filed Jan. 25, 2002.
Office Action mailed Mar. 18, 2005 from U.S. Appl. No. 10/056,932, filed Jan. 25, 2002.
Office Action mailed Jun. 25, 2009 from U.S. Appl. No. 11/427,243, filed Jun. 28, 2006.
Office Action mailed Apr. 27, 2010 from U.S. Appl. No. 11/427,282, filed Jun. 28, 2006.
Office Action mailed Jul. 27, 2005 from U.S. Appl. No. 10/056,932, filed Jan. 25, 2002.
Office Action mailed Oct. 27, 2010 from U.S. Appl. No. 11/207,590, filed Aug. 19, 2005.
Office Action mailed Sep. 28, 2010 from U.S. Appl. No. 10/061,107, filed Jan. 25, 2002.
Office Action mailed Sep. 5, 2003 from U.S. Appl. No. 10/056,932, filed Jan. 25, 2002.
Office Action mailed May 7, 2004 from U.S. Appl. No. 10/056,932, filed Jan. 25, 2002.
Offie Action mailed May 5, 2006 from U.S. Appl. No. 10/061,107, filed Jan. 25, 2002.
Otsuka, Shingo, et al. 2004. The Analysis of Users Behavior Using Global Web Access Logs. IPSJ SIG Technical Report, vol. 2004 No. 71 (Jul. 13, 2004), pp. 17-24.
Paepcke, Andreas, et al., "Beyond Document Similarity: Understanding Value-Based Search and Browsing Technologies", ACM SIGMOD Record, vol. 29, Issue 1, Mar. 2000, pp. 80-92.
Paganelli, Laila, et al., "Intelligent Analysis of User Interactions with Web Applications", IUI '02, San Francisco, CA, Jan. 13-16, 2002, pp. 111-118.
Park, Joon S., et al., "Secure Cookies on the Web", IEEE Internet Computing, vol. 4, Issue 4, Jul./Aug. 2000, pp. 36-44.
PCT International Preliminary Report on Patentability, dated Jan. 9, 2008, for International Application No. PCT/US06/023386.
PCT International Search Report and Written Opinion dated Jul. 12, 2007, for International Application No. PCT/US06/023386.
PCT International Search Report and Written Opinion dated Jul. 26, 2007, for International Application No. PCT/US06/025102.
PCT International Search Report and Written Opinion dated Jun. 28, 2006, for International Application No. PCT/US06/025103.
PCT International Search Report and Written Opinion mailed Feb 14, 2008, for International Application No. PCT/US07/061944.
PCT International Search Report dated Jan 23, 2007, for International Application No. PCT/US06/025104.
PCT International Search Report for PCT/US03/13985 mailed Aug. 8, 2003; total of 1 sheet.
Pierrakos, Dimitrios, et al., "Web Usage Mining as a Tool for Personalization: A Survey", User Modeling and User-Adapted Interaction, vol. 13, No. 4, (c) 2003, pp. 311-372.
Schonberg, Edith, et al., "Measuring Success", Communications of the ACM, vol. 43, Issue 8, Aug. 2000, pp. 53-57.
Shahabi, Cyrus, et al., "Efficient and Anonymous Web-Usage Mining for Web Personalization", INFORMS Journal on Computing, vol. 15, No. 2, Spring 2003, pp. 123-148.
Smith, Lindsay I. 2002. A Tutorial on Principal Components Analysis. Feb. 26, 2002.
Srivastava, Jaideep, et al., "Web Usage Mining: Discovery and Applications of Usage Patterns from Web Data", SIGKDD Explorations, vol. 1. Issue 2, Jan. 2000, pp. 12-23.
Takahashi. 2001. JavaScript Lab: Safe Control of Pop-up Windows. Web Designing. Mainichi Communications, Inc. Jun. 10, 2001. No. 9, vol. 12, pp. 86-89 (separate volume of Mac Fan of June 10 issue).
U.K. Intellectual Property Office, Examination Report in Great Britain application, GB0724938.6, dated Jan 11, 2010, 2 pages.
U.K. Intellectual Property Office, Official Action for British Application No. GB0724938.6, filed Jun. 28, 2008, Feb. 16, 2011—UK IPO Decision of Rejection.
U.K. Intellectual Property Office, Official Action mailed Jul. 16, 2010 for British Application No. GB0724938.6, filed Jun. 28, 2008 [1 pg.].
U.S. Appln. No. 10/061,107—Apr. 18, 2011 PTO Office Action.
U.S. Appln. No. 11/420,191—Mar. 25, 2011 PTO Office Action.
Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.
USPTO, Office Action in U.S. Appln. No. 11/688,160, mailed Feb. 16, 2011.
USPTO, Office Action mailed Nov. 28, 2006 for U.S. Appl. No. 10/227,168, filed Aug. 23, 2002.
USPTO, Office Action mailed Jul. 3, 2006 from U.S. Appl. No. 10/227,168, filed Aug. 23, 2002.
Wenyin, Liu, et al., "Ubiquitous Media Agents: A Framework for Managing Personally Accumulated Multimedia Files", Multimedia Systems, vol. 9, No. 2, Aug. 2003, pp. 144-156.
WIPO, International Preliminary Report on Patentability (Chap. I of PCT) for PCT/US04/33777, Jan. 23, 2006 [4 pgs].
WIPO, International Preliminary Report on Patentability (Chap. I of PCT) for PCT/US05/01022, Aug. 14, 2006 [6 pgs].
WIPO, International Search Report for PCT/USO4/33777, Jan. 19, 2006 [3 pgs.].
WIPO, International Search Report for PCT/US05/01022, Apr. 24, 2006 [3 pgs.].
WIPO, Written Opinion of The International Searching Authority for PCT/US04/33777, Jan. 23, 2006 [3 pgs].
WIPO, Written Opinion of The International Searching Authority for PCT/US05/01022, Apr. 26, 2006 [5 pgs].
Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.
Yuichi Yagawa et al. TV Program Planning Agent using Analysis Method of User's Taste; IEICE Technical Report vol. 98, No. 437: The Institute of Electronics, Information and Communication Engineers; Dec. 1, 1998, vol. 98, No. 437, pp. 9-16.
Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.

\* cited by examiner

SEARCH ENGINE FOR A COMPUTER NETWORK

BACKGROUND OF THE INVENTION

1. Field of the Invention

The present invention relates generally to computer systems, and more particularly but not exclusively to search engines.

2. Description of the Background Art

The Internet is an example of a computer network. On the Internet, consumers on client computers may access various types of information resident in server computers. A server computer that provides information over the Internet is also referred to as a "web server" or a "website". A website may provide information about various topics, or offer goods and services. A website may comprise a plurality of downloadable documents, such as web pages and files. A consumer may use a web browser to receive and view a web page.

Because of the large number of websites on the Internet, searching the Internet for specific information usually requires the services of a search engine. Generally speaking, a search engine helps consumers look for relevant web pages. A typical search engine accepts a word or a phrase, referred to herein as a "keyword." The search engine employs the keyword in conjunction with its search algorithm to find matching web pages. The links to matching web pages are presented to the consumer in the form of a listing referred to as "search results." Typical search results list the matching web pages as clickable links, with each link pointing to a corresponding web page. Examples of websites with search engines include Yahoo, Google, and Alta Vista.

A search engine includes an index (also referred to as a "catalog") containing links to web pages responsive to particular keywords. Entries to the index may be obtained by accepting submissions from website operators, as in the case of so-called "human-powered search engines," by using a crawler, or both. Crawler-based search engines employ a crawler (also referred to as a "spider" or "robot") to automatically fetch web pages over the Internet. A crawler may be given an address of a web page, fetch that web page, then fetch web pages pointed to by that web page, and so on. Web pages fetched by the crawler are stored in the index.

A keyword and a link responsive to the keyword are also collectively referred to as a "keyword-link combination." A typical search engine ranks keyword-link combinations stored in an index based on the relevance of the link to the keyword. A keyword-link combination may be ranked based on the number of times the keyword appears on the web page pointed to by the link. The web page pointed to by the link may be further ranked based on the number and credibility of other web pages pointing to it. For example, when a keyword appears the same number of times on two different web pages, the web page referenced by more, credible web pages gets the higher ranking. When a consumer employs a search engine to search the Internet using a keyword, the search engine sifts through the index to find the highest ranked keyword-link combinations having that keyword. Links of the highest ranked keyword-link combinations are presented to the consumer as search results.

SUMMARY

In one embodiment, client-side programs are employed to observe the navigation of consumers to various websites. Addresses of web pages viewed by consumers may be used to fetch the web pages. A fetched web page may be parsed for one or more keywords. The relevance of the web page to a keyword may be determined according to consumer preferences, which may relate to consumer interaction with the web page. Web pages and their ranking information may be stored in an index. The index may be consulted to find links to web pages relevant to a keyword employed in a search request.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable medium may comprise computer-readable program code for performing the function of a particular component. Likewise, computer memory may be configured to include one or more components, which may then be executed by a processor. Components may be implemented separately in multiple modules or together in a single module.

Figure 1:
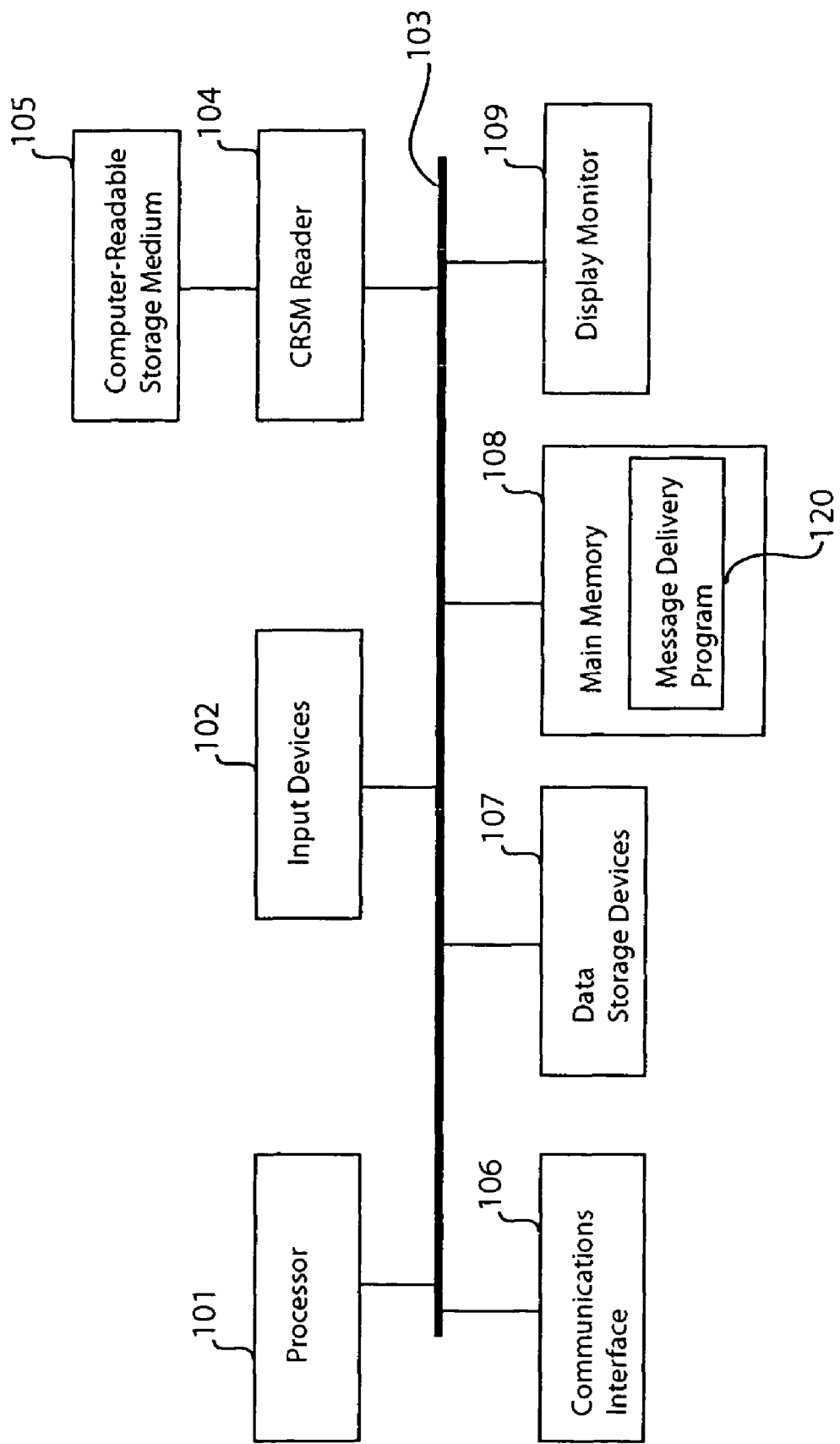
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer, a server computer, or other data processing device. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one ore more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments in main memory 108 may be executed by processor 101. In the example of FIG. 1, main memory 108 is shown as having a message delivery program 120, which is further described below. Message delivery program 120 and other programs in main memory 108 may be loaded from a computer-readable storage medium 105, a data storage device 107, or over the Internet by way of communications interface 106, for example. Message delivery program 120 and other programs in main memory 108 may be executed by processor 101.

Figure 2:
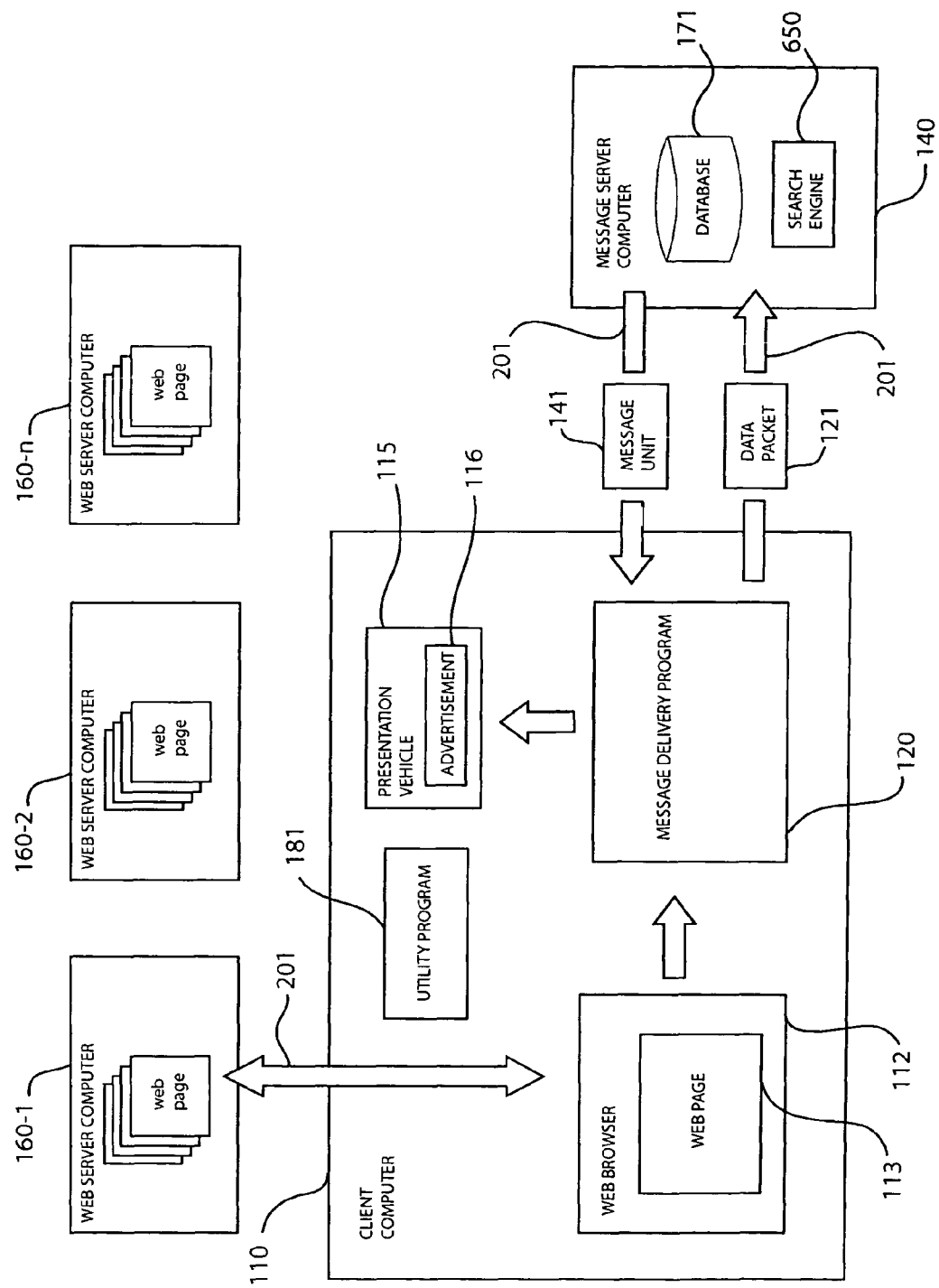
FIG. 2 shows a schematic diagram of a computing environment in accordance with an embodiment of the present invention.

FIG. 2 shows a schematic diagram of a computing environment in accordance with an embodiment of the present invention. In the example of FIG. 2, the computing environment includes one or more web server computers 160 (i.e., 160-1, 160-2, . . . ), one or more client computers 110, one or more message server computers 140, and other computers not specifically shown. In the example of FIG. 2, a client computer 110 communicates with server computers (e.g., a web server computer or a message server computer) over the Internet. As such, arrows 201 denote Internet connections in this example. Intermediate nodes such as gateways, routers, bridges, Internet service provider networks, public-switched telephone networks, proxy servers, firewalls, and other network components are not shown for clarity.

A client computer 110 is typically, but not necessarily, a personal computer such as those running the Microsoft Windows™ operating system, for example. A consumer may employ a suitably equipped client computer 110 to get on the Internet and access computers coupled thereto. For example, a client computer 110 may be used to access web pages from a web server computer 160.

A web server computer 160 may be a server computer hosting a website, which comprises web pages designed to attract consumers surfing on the Internet. A web server computer 160 may include web pages supporting advertisements, downloadable computer programs, products available for online purchase, and so on. As can be appreciated, a website may be on one or more server computers.

A message server computer 140 may include the functionalities of a web server computer 160. In one embodiment, a message server computer 140 further includes a database 171. Database 171 may be a commercially available database, such as those available from the Oracle Corporation. Database 171 may store client data received from message delivery programs 120 running in client computers 110. The client data may be transmitted from a client computer 110 to message server computer 140 in a data packet 121. The client data may include navigation and behavioral data obtained by a message delivery program 120 by monitoring a consumer's online activities. In the example of FIG. 2, message server computer 140 is shown as communicating with one client computer 110 for clarity of illustration. In practice, message server computer 140 receives data packets 121 containing client data from a plurality of client computers 110, each of which has a message delivery program 120. A message server computer 140 may also include downloadable computer programs and files for supporting, updating, and maintaining software components on a client computer 110.

Web server computers 160 and message server computers 140 are typically, but not necessarily, server computers such as those available from Sun Microsystems, Hewlett-Packard, or International Business Machines. A client computer 110 may communicate with a web server computer 160 or a message server computer 140 using client-server protocol. It is to be noted that client-server computing is well known in the art and will not be further described here.

As shown in FIG. 2, a client computer 110 may include a web browser 112 and a message delivery program 120. Web browser 112 may be a commercially available web browser or web client. In one embodiment, web browser 112 comprises the Microsoft Internet Explorer™ web browser. A web browser allows a consumer on a client computer to access a web page. In the example of FIG. 2, web browser 112 is depicted as displaying a web page 113 from a web server computer 160. A web page, such as web page 113, has a corresponding address referred to as a "URL" (Uniform Resource Locator). Web browser 112 is pointed to the URL of a web page to receive that web page in client computer 110. Web browser 112 may be pointed to a URL by entering the URL at an address window of web browser 112, or by clicking a link pointed to that URL, for example.

In one embodiment, message delivery program 120 is downloadable from a message server computer 140 or a web server computer 160. Message delivery program 120 may be downloaded to a client computer 110 in conjunction with the downloading of another computer program. For example, message delivery program 120 may be downloaded to client computer 110 along with a utility program 181 that is provided free of charge or at a reduced cost. Utility program 181 may be an e-wallet or calendar program, for example. Utility program 181 may be provided to a consumer in exchange for the right to deliver advertisements to that consumer's client computer 110 via message delivery program 120. In essence, revenue from advertisements delivered to the consumer helps defray the cost of creating and maintaining the utility program. Message delivery program 120 may also be provided to the consumer along with free or reduced cost access to an online service, for example.

Message delivery program 120 is a client-side program in that it is stored and run in a client computer 110. Message delivery program 120 may comprise computer-readable program code for displaying advertisements in a client computer 110 and for monitoring the online activity of a consumer on the client computer 110. It is to be noted that the mechanics of monitoring a consumer's online activity, such as determining where a consumer is navigating to, the URL of web pages received in client computer 110, the domain names of websites visited by the consumer, what the consumer is typing on a web page, what keyword the consumer is providing to a search engine, whether the consumer clicked on a link or an advertisement, when the consumer activates a mouse or keyboard, and the like, is, in general, known in the art and not further described here. For example, message delivery program 120 may learn of consumer online activities by receiving event notifications from web browser 112.

Message delivery program 120 may record the consumer's online activity for reporting to message server computer 140.

The recorded consumer online activity is also referred to as "client data," and provided to message server computer 140 using data packets 121. Message server computer 140 may use the client data to provide targeted advertisements to the consumer. Message server computer 140 may include the advertisement or data for displaying the advertisement in a message unit 141. In the example of FIG. 2, the targeted advertisement is labeled as advertisement 116 and displayed in a presentation vehicle 115. Presentation vehicle 115 may be a pop-under, pop-up, separate browser window, custom browser window, or other means for displaying an advertisement on a computer screen. Techniques for delivering advertisements to client computers using a client-side program are also disclosed in commonly-owned U.S. Pat. No. 7,069,515, entitled "Method and Apparatus for Displaying Messages in Computer Systems," filed on May 21, 2002 by Scott G. Eagle, David L. Goulden, Anthony G. Martin, and Eugene A. Veteska, issued Jun. 27, 2006, which is incorporated herein by reference in its entirety.

As will be more apparent below, message delivery programs are primarily used in embodiments of the present invention to obtain client data for building a search engine index, not necessarily to display presentation vehicles in a client computer 110. That is, a message delivery program does not necessarily have to display advertisements in a client computer 110. This is advantageous in that consumers may be allowed to obtain a free or reduced cost utility program 181 (or other benefits) without having to see advertisements from the provider or sponsor of the utility program.

Figure 3:
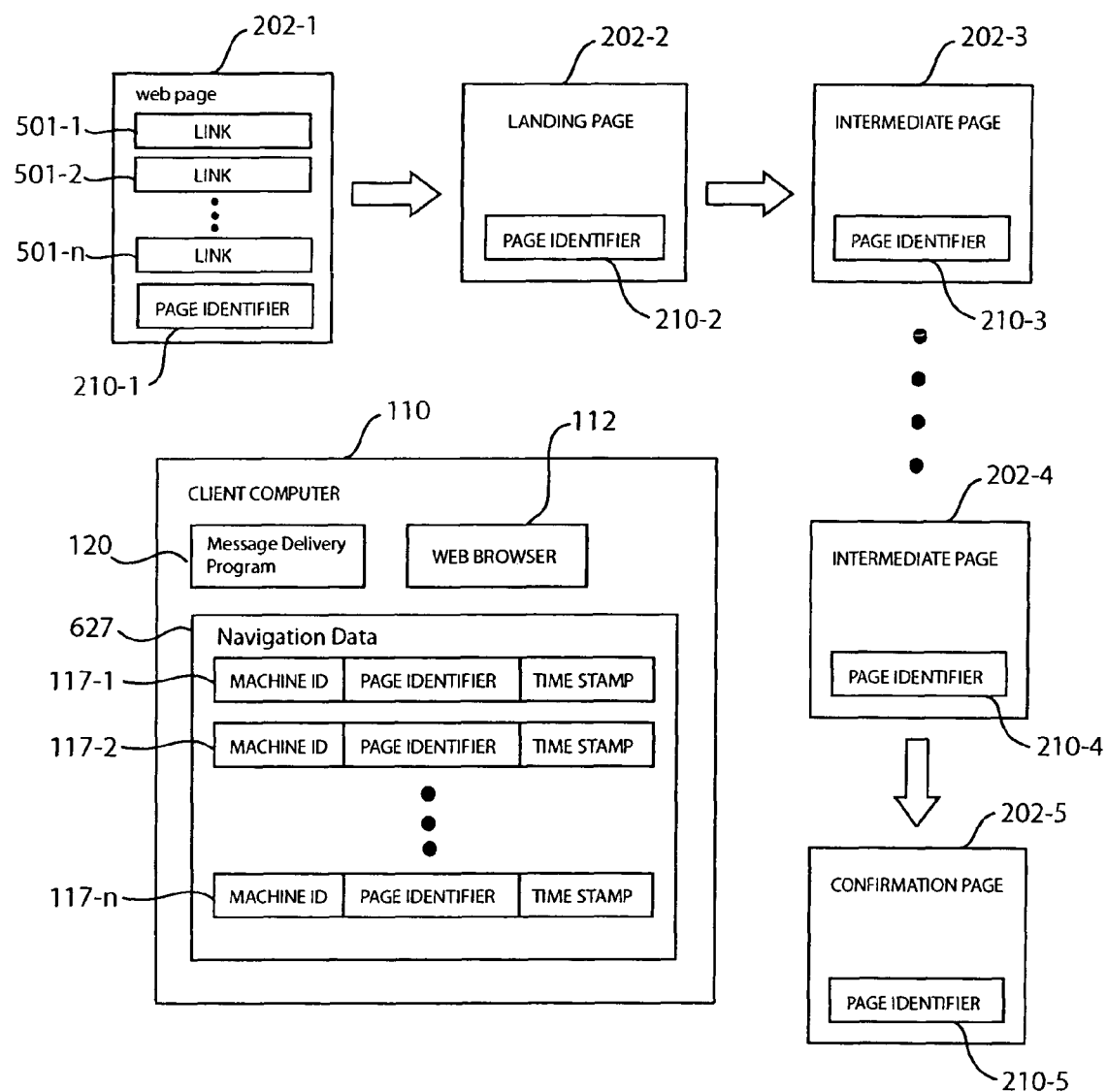
FIG. 3 schematically illustrates the tracking of a conversion process, in accordance with an embodiment of the present invention.

FIG. 3 schematically illustrates the tracking of a conversion process, in accordance with an embodiment of the present invention. A "conversion" occurs when a consumer makes an online purchase in response to an advertisement presented to her. As will be more apparent below, embodiments of the invention may use conversion as a factor in ranking a keyword-link combination. In the example of FIG. 3, web pages 202 (i.e., 202-1, 202-2, . . . ) may be sequentially displayed in the same or separate windows of web browser 112. Each web page 202 includes a page identifier 210 (i.e., 210-1, 210-2, . . . ), which may be a URL. Message delivery program 120 records the URLs of web pages 202 viewed by the consumer as well the amount of time the consumer spent with each web page as navigation data. For purposes of the present disclosure, the web pages "viewed" by consumers are those web pages received in client computers. In the example of FIG. 3, navigation data 627 comprises log entries 117 (i.e., 117-1, 117-2, . . . ). Each log entry 117 includes a machine ID anonymously identifying the client computer 110 (or the consumer), a page identifier, and a time stamp indicating when the log entry 117 was made. The time stamps between log entries 117 provide an estimate of the amount of time the consumer spent viewing the indicated web page. A log entry 117 may be created for each web page 202 viewed by the consumer. For example, a log entry 117-1 may be created when the consumer clicks on a link 501 to receive web page 202-2 in client computer 110, a log entry 117-2 may be created when the consumer receives web page 202-3 in client computer 110, and so on.

In the example of FIG. 3, web page 202-2 is also referred to as a "landing page" because it is the web page directly pointed to by an advertisement having a link in web page 202-1. A website that sells products online may also have a "confirmation page" 202-5. A confirmation page is a web page provided to the consumer to confirm a just completed online purchase. A website may have "intermediate pages" 202-3, 202-4, and so on between a landing page 202-2 and a confirmation page 202-5. An intermediate page may be an online product catalog, shopping cart, and other types of web pages. The page identifiers of landing and confirmation pages of popular or partner websites may be stored in database 171 of message server computer 140. The page identifiers of the landing and confirmation pages may be compared to those in navigation data 627 of client computers 110 to determine the number of consumers making online purchases from a particular web page. As can be appreciated, web pages from which consumers make purchases may be highly relevant, and may thus be deemed a consumer preferred page. Techniques for monitoring consumer purchase behavior are also disclosed in commonly-owned U.S. Pat. No. 7,401,140, entitled "Generation of Statistical Information In a Computer Network," filed by David L. Goulden and Dominic Bennett on Jun. 17, 2003, and issued Jul. 15, 2008, which is incorporated herein by reference in its entirety.

Figure 4:
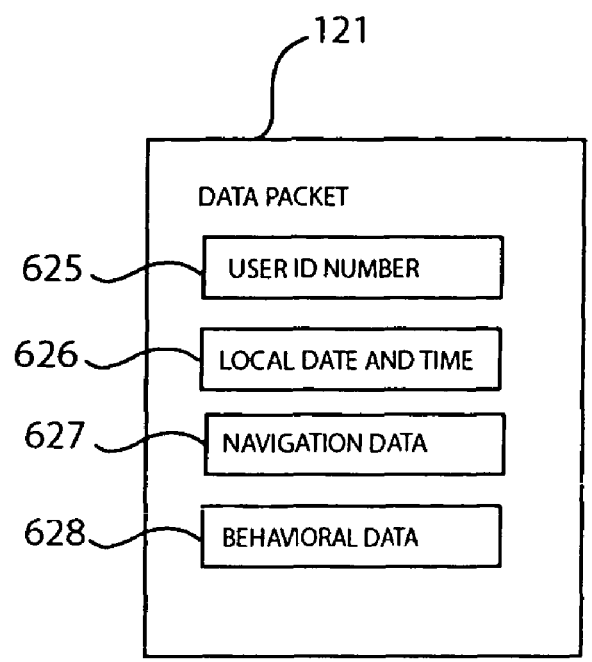
FIG. 4 schematically shows a data packet in accordance with an embodiment of the present invention.

FIG. 4 schematically shows a data packet 121 in accordance with an embodiment of the present invention. A data packet 121 may include a user ID number 625 anonymously identifying the consumer or her client computer, local date and time 626 indicating when the data packet 121 was sent from the client computer 110 to message server computer 140, navigation data 627, and behavioral data 628. Navigation data 627 include navigation related information, such as addresses of web pages viewed by the consumer. Example navigation data 627 has been discussed in connection with FIG. 3. Behavioral data 628 may contain information indicative of consumer online behavior, such as advertisements and links the consumer clicked on, advertisements converted into a purchase, and the like.

Figure 5:
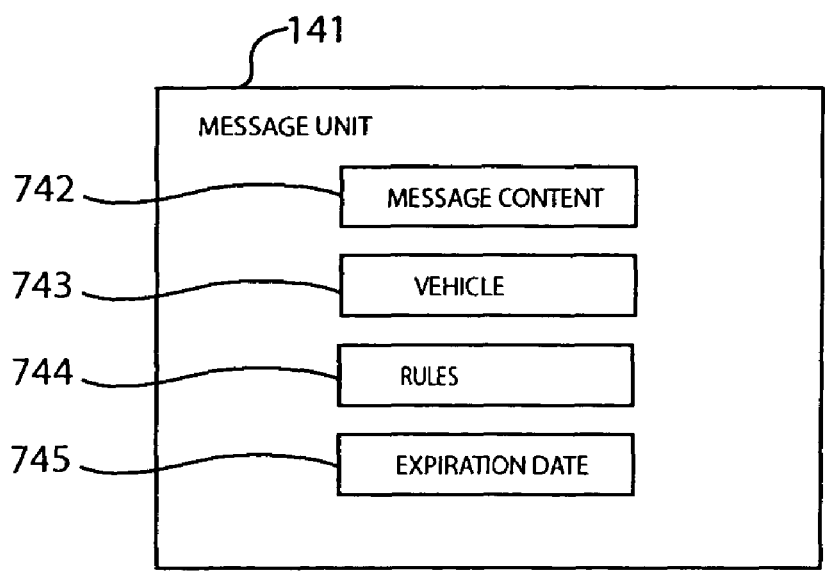
FIG. 5 schematically shows a message unit in accordance with an embodiment of the present invention.

Referring to FIG. 5, there is schematically shown a message unit 141 in accordance with an embodiment of the present invention. A message unit 141 may include a message content 742, a vehicle 743, rules 744, and an expiration date 745. Message content 742 may include computer-readable program code, text, images, audio, video, hyperlink, and other information. A message content 742 may be an advertisement or computer-readable program code for receiving an advertisement from an ad server, for example.

Vehicle 743 indicates the presentation vehicle to be used in presenting the message content indicated by message content 742. For example, vehicle 743 may call for the use of a pop-up, banner, message box, text box, slider, separate window, window embedded in a web page, or other presentation vehicle to display a message content. In the example of FIG. 2, advertisement 116 and presentation vehicle 115 may be specified in a message content 742 and vehicle 743, respectively, of a message unit 141.

Rules 744 indicate one or more triggering conditions for processing a message unit 141. Rules 744 may specify to display a message content 742 when a consumer navigates to a specific web page or as soon as the message unit 141 is received in a client computer 110. For example, a car company may contract with the operator of a message server computer 140 to deliver a message unit 141 containing an advertisement for a minivan (hereinafter, "minivan message unit"). The rules 744 of the minivan message unit may specify that the minivan advertisement is to be displayed to consumers viewing the minivan web page of "cars.com". In this example, the minivan web page of cars.com has the URL "www.cars.com/minivans". When a consumer visits the main page (or any web page) of "cars.com", message delivery program 120 (see FIG. 2) will send a data packet 121 to message server computer 140 indicating that the consumer is on "cars.com". In response, message server computer 140 will send the minivan message unit to client computer 110. When the consumer navigates to the URL "www.cars.com/ minivans", message delivery program 120 will detect that the minivan message unit has been triggered for processing (i.e., rules 744 of the minivan message unit have been satisfied). Accordingly, message delivery program 120 will process the minivan message unit by displaying it.

Rules 744 may also include: (a) a list of domain names at which the content of a message unit 141 is to be displayed, (b) URL sub-strings that will trigger displaying of the content of the message unit 141, and (b) time and date information. As shown in FIG. 5, a message unit 141 may also include an expiration date 745. Expiration date 745 indicates the latest date and time the message unit 141 can still be processed. In one embodiment, expired message units 141 are not processed even if their rules 744 have been satisfied. Expired message units 141 may be removed from client computer 110.

Figure 6:
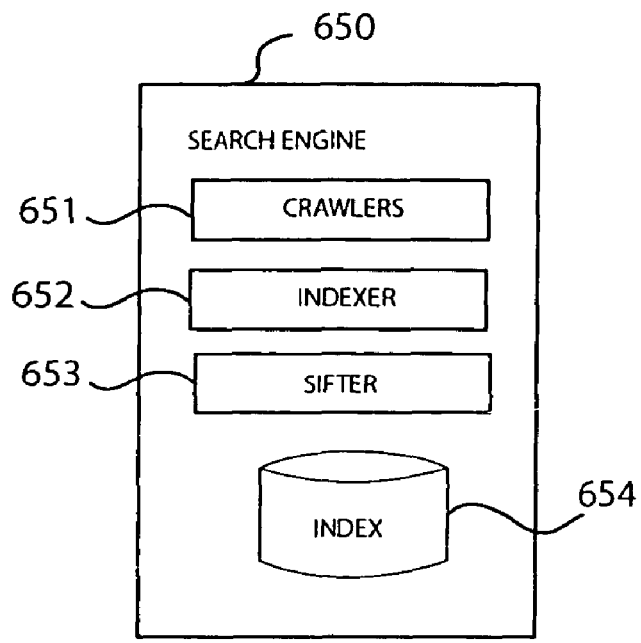
FIG. 6 shows a schematic diagram of a search engine in accordance with an embodiment of the present invention.

FIG. 6 shows a schematic diagram of a search engine 650 in accordance with an embodiment of the present invention. A search engine 650 may be implemented in a message server computer 140 as shown in FIG. 2, or in one or more dedicated server computers, for example. A search engine 650 may be employed to provide search results to a consumer performing a keyword search. A keyword may be a word or a phrase, for example. Search results may be presented to a consumer as a web page containing one or more links responsive to a search request for one or more keywords. In the example of FIG. 6, a search engine 650 may include one or more crawlers 651, an indexer 652, a sifter 653, and an index 654.

Crawlers 651 may comprise computer-readable program code running on one or more computers. A crawler 651, also referred to as a "spider", "robot", or "bot", performs a discovery function for a search engine 650. A search engine 650 employs a crawler 651 to fetch web pages over the Internet. Note that a search engine 650 may divide the web page fetching function to one or more crawlers 651. The fetched web pages may be indexed, ranked and stored in an index 654.

Figure 7:
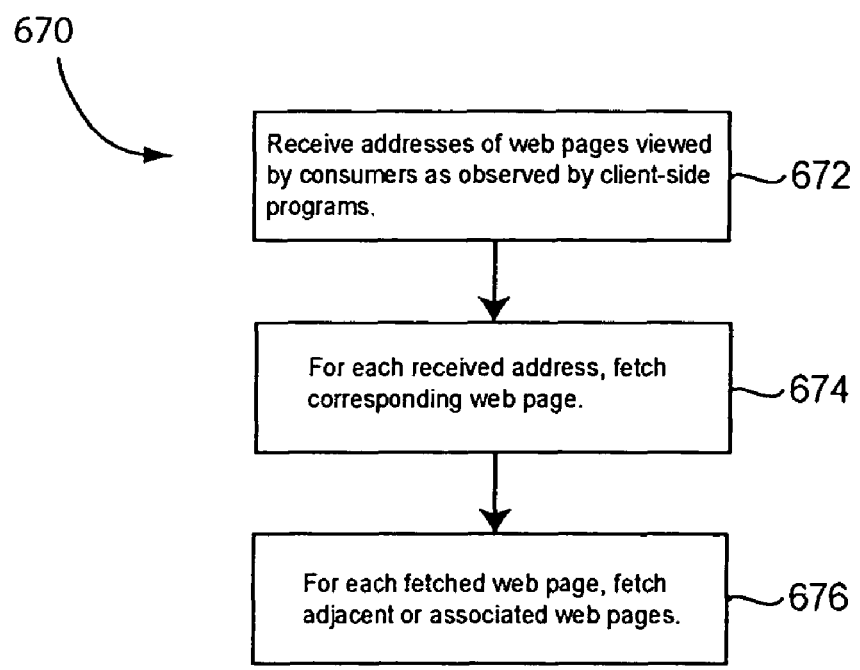
FIG. 7 shows a flow diagram of a method that may be performed by a crawler, in accordance with an embodiment of the present invention.

FIG. 7 shows a flow diagram of a method 670 that may be performed by a crawler 651, in accordance with an embodiment of the present invention. In step 672, the crawler 651 receives addresses of web pages viewed by consumers as observed by client-side programs, such as a message delivery program 120. The addresses of web pages viewed by consumers may be extracted from navigation data contained in data packets 121, which may be stored in a database 171. In step 674, using the addresses received in step 672, the crawler 651 fetches the web pages viewed by the consumers. In step 676, for each fetched web page, a crawler 651 may fetch adjacent or associated web pages. An adjacent web page may be a web page one level below or above the fetched web page. A web page one level above a fetched web page may be a clickable link on the fetched web page, for example. A web page one level below the fetched web page may have a URL cut from the URL of the fetched web page. For example, if the fetched web page has the URL "http://main_page/level1.htm/level2.htm", a web page one level below the fetched web page would have the URL "http://main_page/level1.htm/". Associated web pages are those that are linked to the fetched web page through one or more web pages.

In light of the present disclosure, it can be appreciated that crawling to web pages actually viewed by consumers and adjacent web pages advantageously limit the contents of an index 654 to useable web pages. In other words, determining web pages viewed by consumers and using those web pages for search purposes, allow the search engine 650 to provide search results containing links to web pages actually employed by consumers. In marked contrast, conventional search engines have crawlers that follow a long chain of links from a particular web page, regardless of whether or not consumers actually use those web pages. While the conventional approach may yield an index containing lots of fetched web pages, those web pages are not necessarily relevant or useful to consumers. In other words, these conventional search engines may generate search results containing many links to not quite useful web pages. Furthermore, the approach taken by conventional search engines requires a relatively large amount of computer resources to perform crawling and indexing functions.

An indexer 652 may comprise computer-readable program code for parsing, ranking, and indexing web pages fetched by a crawler 651. An indexer 652 may parse a fetched web page for the occurrence of one or more keywords for indexing purposes. A fetched web page may be identified by its address, which may be used as a link in a search result responsive to a keyword. Each keyword may be associated with a link, referred to as a "keyword-link" combination. A keyword-link combination may be ranked according to the relevance of the link to the keyword. Typical algorithms for ranking keyword-link combinations include taking into account the number of times the keyword appears on the link (i.e., the web page pointed to by the link), proximity of the keyword to other keywords, and use of regular expressions or other text-matching techniques.

To increase traffic on their websites, webmasters have come up with ways to "defeat" common ranking algorithms and artificially increase the ranking of their web pages. For example, web pages may be filled with non-visible popular texts, trademarked names, and so on to make them appear relevant to a search engine. In response, some conventional search engines also take into account the number of web pages pointing to a particular web page. That is, a keyword-link combination may also be ranked based on the number of other web pages pointing to the link and the credibility (e.g., university web page versus porn web page) of the pointing web pages. While this approach improves the quality of the ranking, it still has at least two major flaws. Firstly, this approach may inaccurately rank highly relevant web pages that are not pointed to by most web pages. Secondly, deeming certain sites as more credible than others is elitist and may or may not be correct. A site that is credible for one subject may not be for others.

In one embodiment, an indexer 652 takes into account consumer preferences in ranking a keyword-link combination. Consumer preferences include factors relating to consumer interaction with a web page. Consumer preferences may be measured in terms of how long consumers spend on a web page, the number of consumers who made an online purchase from a web page, the number of times a particular consumer viewed a web page within a given period of time, and the number of times consumers clicked on a link on a web page, for example. Consumer preferences may be taken into account along with conventional ranking factors in ranking keyword-link combinations. Weights may be assigned to particular consumer preferences and other ranking factors (which may be conventional) to come up with a score for a keyword-link combination. The scores of keyword-link combinations may be employed to determine their ranking. In responding to a search request for a particular keyword, the search engine 650 may list the responsive keyword-link combinations by rank on a search results web page.

The ranking of keyword-link combinations based on consumer preferences for search purposes is also disclosed in commonly-assigned U.S. application Ser. No. 10/815,112, filed on Mar. 31, 2004, published as U.S. Patent Publication No. 2005-0222982 A1 on Oct. 6, 2005, which is incorporated herein by reference in its entirety.

Figure 8:
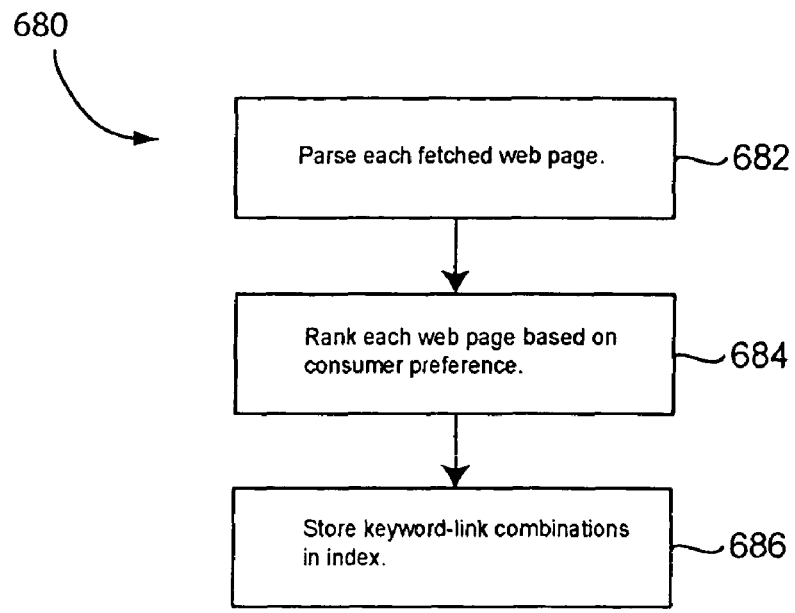
FIG. 8 shows a flow diagram of a method that may be performed by an indexer, in accordance with an embodiment of the present invention.

FIG. 8 shows a flow diagram of a method 680 that may be performed by an indexer 652, in accordance with an embodiment of the present invention. In step 682, the indexer 652 parses web pages fetched by a crawler 651. A fetched web page may be parsed for the presence of one or more keywords. In step 684, the relevance of a parsed web page to one or more keywords is ranked according to a ranking process that takes into account consumer preferences as discussed above. In step 686, the indexer 652 stores keyword-link combinations and their ranking information in an index 654.

In contrast to ranking algorithms employed by conventional search engines, taking into account consumer preferences advantageously allow for ranking that is based on actual consumer interaction with the web page. Taking into account consumer preferences is a democratic, as opposed to elitist, approach that increases ranking accuracy by effectively giving consumers a "vote" on which web pages are relevant for a particular keyword.

As shown in FIG. 6, a search engine 650 may also include a sifter 653. A sifter 653 may comprise computer-readable program code for sifting through keyword-link combinations and corresponding ranking information stored in an index 654. An index 654 may comprise a searchable, commercially-available database program, for example. Upon receiving a keyword as part of a search request from a consumer, the sifter 653 may consult the index 654 for links having a keyword-link combination with that keyword. The sifter 653 may order the responsive keyword-link combinations according to their ranking, and provide a corresponding search results web page.

Figure 9:
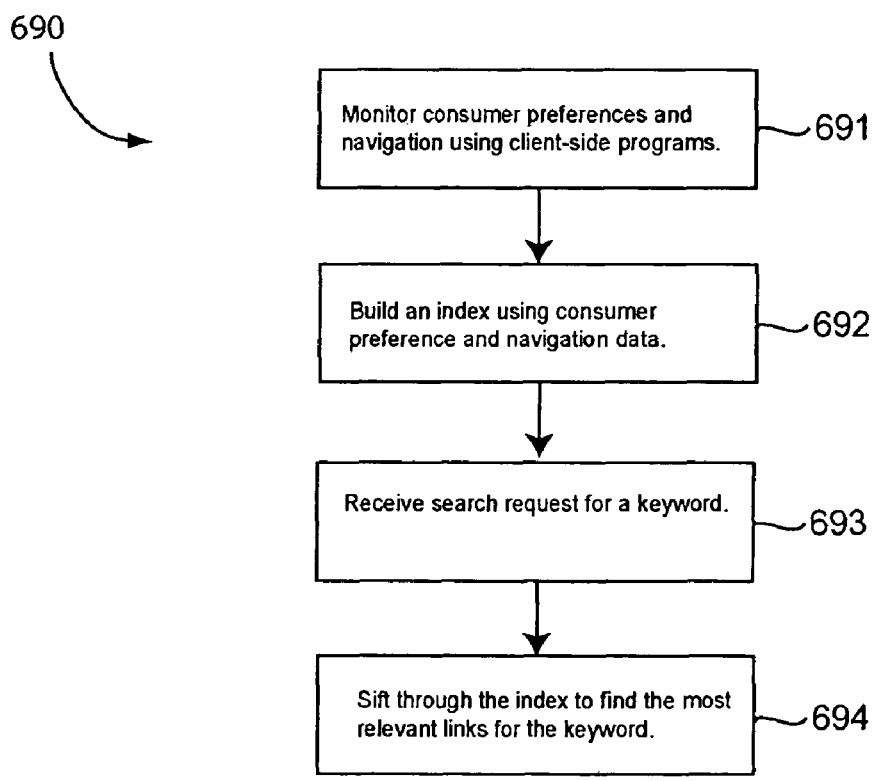
FIG. 9 shows a flow diagram of a method for responding to a search request, in accordance with an embodiment of the present invention.

Referring now to FIG. 9, there is shown a flow diagram of a method 690 for responding to a search request, in accordance with an embodiment of the present invention. In step 691, consumer preferences and navigations to various websites are monitored using programs running on client computers. Client-side programs may monitor consumer preferences, such as the number of consumers who received a web page, the number of clicks made on a web page, and so on. Client-side programs may also note the addresses of web pages viewed by the consumer. Data indicative of consumer preferences and navigation may be sent out of a client computer and sent to a message server computer associated with a search engine, for example.

In step 692, consumer preference and navigation data reported by client-side programs may be employed to build an index for a search engine. In one embodiment, addresses of web pages viewed by consumers are extracted from navigation data reported by client-side programs. One or more crawlers may be employed to fetch those web pages, which may be parsed to build keyword-link combinations. Keyword-link combinations may be ranked using a ranking process that takes into account consumer preferences. Keyword-link combinations and their ranking information may be stored in the index.

In step 693, a search engine receives a search request for a keyword. The keyword may be received from a consumer performing a search over the Internet. The search engine may be implemented in an Internet portal or another web server.

In step 694, the search engine may consult the index to find top ranked keyword-link combinations that include that keyword. In response to the search request, links from top ranked keyword-link combinations responsive to the keyword may be included in search results provided to the consumer.

As can be appreciated, embodiments of the present invention may be employed to provide a search engine service over the Internet and other computer networks. Embodiments of the present invention may be incorporated in existing search engines to provide more responsive search results.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method for presenting results in response to a search query, the method comprising the steps of:
   (A) obtaining consumer navigation data and behavioral data from multiple user computers;
   (B) for each of a plurality of web pages identified by said navigation data, using said consumer navigation data and said behavioral data to determine corresponding implied consumer preference data;
   (C) building a search engine index using at least the consumer navigation data and the implied consumer preference data, said step of building comprising:
      (c1) using said consumer navigation data to determine a particular web page viewed on at least one of said multiple user computers;
      (c2) parsing a copy of the particular web page to determine the occurrence of one or more keywords in the particular web page; and
      (c3) ranking the particular web page relative to at least some of the one or more keywords, said ranking being based at least in part on results of the parsing and on implied consumer preference data associated with the particular web page;
   (D) receiving a search request based on a search keyword; and
   (E) in response to said search request, retrieving results from the search engine index, said results identifying a plurality of web pages, and
   (F) providing the results ordered, at least in part, by a ranking of each of the plurality of web pages relative to the search keyword.

2. The method of claim 1, wherein the consumer navigation data include addresses of web pages viewed at one or more user computers.

3. The method of claim 1, wherein the implied consumer preference data for a particular web page include an amount of time one or more users spent viewing the particular web page.

4. The method of claim 1, wherein the implied consumer preference data for a particular web page include actions taken while viewing the particular web page.

5. The method of claim 1 further comprising:
   repeating steps (c1) to (c3) for multiple web pages identified in the consumer navigation data.

6. The method of claim 1 wherein at least some of the consumer navigation data and the behavioral data are obtained from multiple computer programs running on said multiple user computers.

7. The method of claim 6 wherein at least some of the multiple computer programs are browser independent.

8. The method of claim 1 wherein at least some of the consumer navigation data and the behavioral data are obtained from multiple computer programs running independently of browser programs on said multiple user computers.

9. A server comprising:
   data storage configured to receive consumer navigation data and behavioral data from multiple user computers; and
   a search engine indexer configured to:
   determine, for each of a plurality of web pages identified in said consumer navigation data, corresponding implied consumer preference data, said implied consumer preference data being based, at least in part, on said consumer navigation data and said behavioral data; and to build a search engine index using the consumer navigation and the implied consumer preference data, by:
- (c1) using said consumer navigation data to determine a particular web page viewed by at least one of said multiple user computers;
- (c2) parsing a copy of the particular web page to determine the occurrence of one or more keywords in the particular web page; and
- (c3) ranking the particular web page relative to at least some of the one or more keywords, said ranking being based at least in part on results of the parsing and on implied consumer preference data associated with the particular web page;

the search engine being further configured to receive a search request based on a search keyword, and, responsive to said search request, to retrieve results from the search engine index, said results identifying a plurality of web pages corresponding to said search keyword, and to provide said results, ordered, at least in part, by a ranking of each of the plurality of web pages relative to the search keyword.

10. The system of claim 9, wherein the consumer navigation data include addresses of web pages viewed at a user computer.

11. The system of claim 9, wherein the implied consumer preference data for a particular web page include an amount of time users spent viewing the particular web page.

12. The system of claim 9, wherein the implied consumer preference data for a particular web page include actions taken while viewing the particular web page.

13. The server of claim 9 wherein at least some of the consumer navigation data and the behavioral data are obtained from multiple computer programs running on said multiple user computers.

14. The server of claim 13 wherein at least some of the multiple computer programs are browser independent.

15. The server of claim 9 wherein at least some of the consumer navigation data and the behavioral data are obtained from multiple computer programs running independently of browser programs on said multiple user computers 16. A computer-readable storage medium comprising computer-readable program code, the computer-readable storage code being executable by a processor to perform a method, the method comprising:
- (A) obtaining consumer navigation data and behavioral data from multiple user computers;
- (B) for each of a plurality of web pages identified by the consumer navigation data, using said consumer navigation data and said behavioral data to determine implied consumer preference data;
- (C) building a search engine index using at least the consumer navigation and the implied consumer preference data, wherein said step of building comprises:
  - (c1) using said consumer navigation data to determine a particular web page viewed by at least one of said multiple user computers;
  - (c2) parsing a copy of the particular web page to determine the occurrence of one or more keywords in the particular web page; and
  - (c3) ranking the particular web page relative to at least some of the one or more keywords, said ranking being based at least in part on results of the parsing and on implied consumer preference data associated with the particular web page;
- (D) receiving a search request based on a search keyword; and
- (E) based on the search request, retrieving results from the search engine index, said results identifying a plurality of web pages, and
- (F) providing the results, ordered, at least in part, by a ranking of each of the plurality of web pages relative to the search keyword.

17. The computer-readable storage medium of claim 16, wherein the consumer navigation data include addresses of web pages viewed at a user computer.

18. The computer-readable storage medium of claim 16, wherein the implied consumer preference data for a particular web page include an amount of time one or more users spent viewing the particular web page.

19. The computer-readable storage medium of claim 16, wherein the implied consumer preference data for a particular web page include actions taken while viewing the particular web page.

20. A method comprising the steps of:
- (A) obtaining consumer navigation data from computer programs running on multiple user computers, said navigation data comprising data identifying a plurality of web pages viewed at said user computers;
- (B) obtaining behavioral data from said multiple user computers, said behavioral data relating to said plurality of web pages identified by said consumer navigation data;
- (C) for each of the plurality of web pages identified by the navigation data, using said navigation data and said behavioral data to determine corresponding implied consumer preference data;
- (D) building a search engine index using at least the consumer navigation data and the implied consumer preference data, said step of building comprising, for each particular web page of the plurality of web pages identified by the navigation data:
  - (d1) parsing a copy of the particular web page to determine the occurrence of one or more keywords in the particular web page; and
  - (d2) ranking the particular web page relative to at least some of the one or more keywords, said ranking being based at least in part on results of the parsing and on implied consumer preference data associated with the particular web page; and
- (E) in response to a search request based on a search keyword, retrieving results from the search engine index, said results identifying a plurality of web pages, and
- (F) providing the results ordered, at least in part, by a ranking of the plurality of web pages relative to the search keyword.

21. The method of claim 20 wherein at least some of the multiple computer programs are browser independent.

22. The system of claim 20, wherein the consumer navigation data include addresses of web pages viewed at a user computer.

23. The system of claim 20, wherein the implied consumer preference data for a particular web page include an amount of time users spent viewing the particular web page.

24. The system of claim 20, wherein the implied consumer preference data for a particular web page include actions taken while viewing the particular web page.

25. A method comprising the steps of:
- (A) obtaining consumer navigation data from browser-independent computer programs running on multiple user computers, said navigation data comprising data identifying a plurality of web pages viewed at said user computers;
- (B) for each specific web page of the plurality of web pages identified by the navigation data, using said navigation data to determine corresponding implied consumer preference data for that specific web page;

(C) for each particular web page of the plurality of web pages identified by the navigation data:
- (c1) parsing the copy of the particular web page to determine the occurrence of one or more keywords in the particular web page;
- (c2) ranking a particular web page relative to at least some of the one or more keywords, said ranking being based at least in part on results of the parsing and on implied consumer preference data associated with the particular web page;
- (c3) storing results of said ranking in a search engine index; and, (D) in response to a search request based on a search keyword, retrieving results from the search engine index, said results identifying a plurality of web pages, and (E) providing the results ordered, at least in part, by a ranking of the plurality of web pages relative to the search keyword.

26. The method of claim 20 wherein at least some of the multiple computer programs running on the multiple user computers are running independently of browser programs on said multiple user computers.

27. The system of claim 25, wherein the consumer navigation data include addresses of web pages viewed at a user computer.

28. The system of claim 25, wherein the implied consumer preference data for a particular web page include one or more of:
- (i) an amount of time users spent viewing the particular web page; and
- (ii) actions taken while viewing the particular web page.

* * * * *